(12) United States Patent
Parulkar et al.

(10) Patent No.: US 10,965,737 B1
(45) Date of Patent: Mar. 30, 2021

(54) CLOUD COMPUTING IN COMMUNICATIONS SERVICE PROVIDER NETWORKS

(71) Applicant: Amazon Technologies, Inc., Seattle, WA (US)

(72) Inventors: Ishwardutt Parulkar, San Francisco, CA (US); Georgios Elissaios, Seattle, WA (US); Diwakar Gupta, Seattle, WA (US); Upendra Bhalchandra Shevade, Washington, DC (US); Devlin Roarke Dunsmore, Bothell, WA (US); Scott Renda, Seattle, WA (US); Dougal Stuart Ballantyne, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/699,414

(22) Filed: Nov. 29, 2019

(51) Int. Cl.
*H04L 29/08* (2006.01)
*H04L 29/06* (2006.01)
(Continued)

(52) U.S. Cl.
CPC .......... *H04L 67/10* (2013.01); *H04L 61/2007* (2013.01); *H04L 63/0272* (2013.01); *H04L 63/10* (2013.01); *H04L 67/141* (2013.01); *H04L 67/18* (2013.01); *H04L 67/32* (2013.01); *G06F 9/45558* (2013.01); *G06F 2009/4557* (2013.01);
(Continued)

(58) Field of Classification Search
CPC ....................................................... H04L 67/10
See application file for complete search history.

(56) References Cited

U.S. PATENT DOCUMENTS 8,495,648 B1 * 7/2013 Brandwine ............. H04L 43/04
718/104
8,612,599 B2 * 12/2013 Tung ................... H04L 41/5009
709/226
(Continued)

OTHER PUBLICATIONS

U.S. Appl. No. 16/699,417, Pending.
(Continued)

*Primary Examiner* — Lashonda T Jacobs
(74) *Attorney, Agent, or Firm* — Nicholson De Vos Webster & Elliott, LLP

(57) ABSTRACT

Techniques for reducing latency between resources of a cloud provider network and end user devices are described. In one embodiment, a system includes a cloud provider network including a first control plane service to manage customer compute instances hosted on resources of the cloud provider network. The system further includes a first provider substrate extension of the cloud provider network connected to a first communications service provider network. The first provider substrate extension includes a first computer system having capacity for executing customer compute instances, is controlled at least in part by the first control plane service via a connection through at least a portion of the first communications service provider network, executes at least a first customer compute instance using the first computer system, wherein the first customer compute instance communicates with a first mobile computer system connected via the first communications service provider network.

20 Claims, 14 Drawing Sheets

(51) Int. Cl.
*H04L 29/12* (2006.01)
*G06F 9/455* (2018.01)

(52) U.S. Cl.
CPC .............. *G06F 2009/45587* (2013.01); *G06F 2009/45591* (2013.01)

(56) References Cited

U.S. PATENT DOCUMENTS

| | | | |
|---|---|---|---|
| 8,739,170 B1* | 5/2014 | Gupta | G06F 9/5027 |
| | | | 718/104 |
| 9,451,013 B1* | 9/2016 | Roth | H04L 47/76 |
| 9,641,384 B1* | 5/2017 | Eicher | H04L 41/0686 |
| 9,893,959 B1* | 2/2018 | Duet | H04L 67/10 |
| 10,040,613 B2* | 8/2018 | Radosta | B65D 25/16 |
| 10,069,680 B1* | 9/2018 | Wylie | H04L 41/0806 |
| 10,374,880 B1* | 8/2019 | Gupta | H04L 41/0889 |
| 10,474,825 B1* | 11/2019 | Gupta | G06F 9/44505 |
| 10,530,858 B1* | 1/2020 | Parulkar | H04L 67/1095 |
| 10,594,516 B2* | 3/2020 | Cidon | H04L 61/25 |
| 10,645,020 B1* | 5/2020 | Subramanyam | H04L 41/12 |
| 10,680,945 B1* | 6/2020 | Ye | H04L 45/04 |
| 10,761,875 B1* | 9/2020 | Burgin | G06F 9/4843 |
| 10,791,168 B1* | 9/2020 | Dilley | H04L 41/22 |
| 10,833,949 B2* | 11/2020 | Liguori | H04L 41/0893 |
| 2012/0303818 A1* | 11/2012 | Thibeault | H04L 67/10 |
| | | | 709/226 |
| 2014/0365626 A1* | 12/2014 | Radhakrishnan | G06F 9/5027 |
| | | | 709/222 |
| 2017/0118127 A1* | 4/2017 | Finkelstein | H04L 47/6275 |
| 2018/0032399 A1* | 2/2018 | Johnson | G06F 11/2033 |
| 2019/0149406 A1* | 5/2019 | Fratini | G06F 9/45558 |
| | | | 709/226 |
| 2019/0227843 A1* | 7/2019 | Custodio | G06F 9/505 |
| 2019/0227949 A1* | 7/2019 | Bernat | G06F 12/16 |
| 2019/0265996 A1* | 8/2019 | Shevade | G06F 9/45558 |
| 2020/0045100 A1* | 2/2020 | Rowny | H04L 67/06 |
| 2020/0183724 A1* | 6/2020 | Shevade | G06F 9/5016 |

OTHER PUBLICATIONS

U.S. Appl. No. 16/699,419, Pending.
AT&T, "AT&T's Network and Microsoft's Cloud Deliver New Customer Offerings", available online at <https://about.att.com/story/2019/microsoft.html>, Jul. 17, 2019, 3 pages.
Microsoft, "AT&T Integrating 5G with Microsoft Cloud to Enable Next-Generation Solutions on the Edge", available online at <https://news.microsoft.com/2019/11/26/att-integrating-5g-with-microsoft-cloud-to-enable-next-generation-solutions-on-the-edge/>, Microsoft News Center, Nov. 26, 2019, 6 pages.

* cited by examiner

US 10,965,737 B1

CLOUD COMPUTING IN COMMUNICATIONS SERVICE PROVIDER NETWORKS

BACKGROUND

Cloud computing platforms often provide on-demand, managed computing resources to customers. Such computing resources (e.g., compute and storage capacity) are often provisioned from large pools of capacity installed in data centers. Customers can request computing resources from the "cloud," and the cloud can provision compute resources to those customers. Technologies such as virtual machines and containers are often used to allow customers to securely share capacity of computer systems.

BRIEF DESCRIPTION OF DRAWINGS

Various embodiments in accordance with the present disclosure will be described with reference to the following drawings.

DETAILED DESCRIPTION

Figure 1:
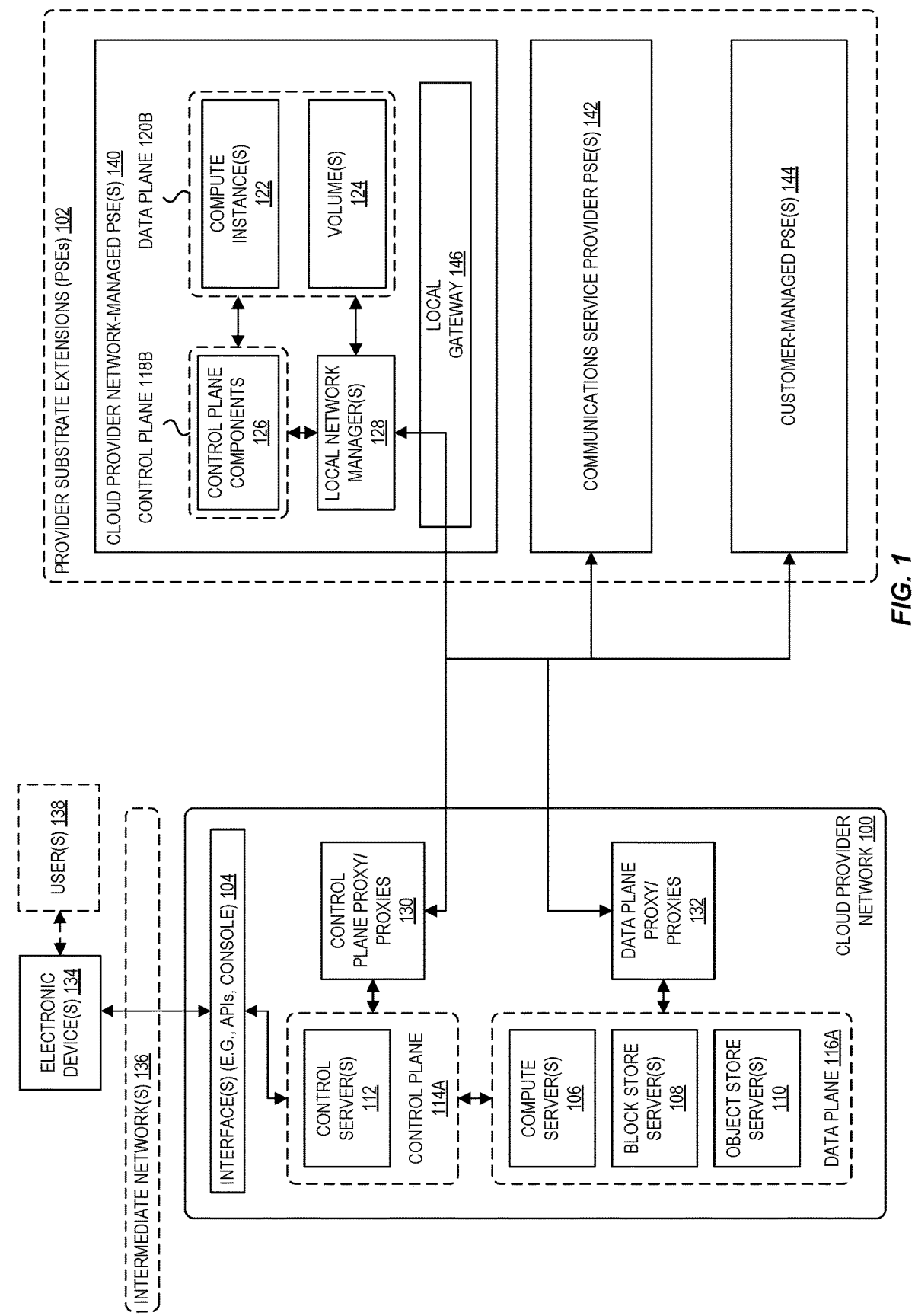
FIG. 1 illustrates an exemplary system including a cloud provider network and further including various provider substrate extensions of the cloud provider network according to some embodiments.

The present disclosure relates to methods, apparatus, systems, and non-transitory computer-readable storage media for providing cloud provider network compute resources within a communications service provider network. According to some embodiments, computing resources managed by a cloud provider are deployed at edge locations of the cloud provider network integrated within communications service provider (CSP) networks. CSPs generally include companies that have deployed networks through which end users obtain network connectivity. For example, CSPs can include mobile or cellular network providers (e.g., operating 3G, 4G, and/or 5G networks), wired internet service providers (e.g., cable, digital subscriber lines, fiber, etc.), and WiFi providers (e.g., at locations such as hotels, coffee shops, airports, etc.). While traditional deployments of computing resources in data centers provide various benefits due to centralization, physical constraints such as the network distance and number of network hops between end user devices and those computing resources can prevent very low latencies from being achieved. By installing or deploying capacity within CSP networks, the cloud provider network operator can provide computing resources with dramatically lower access latency to end user devices—in some cases to single-digit millisecond latency. Such low latency access to compute resources is an important enabler to provide improved responsivity for existing cloud-based applications and to enable the next generation of applications for game streaming, virtual reality, real-time rendering, industrial automation, and autonomous vehicles.

A cloud provider network, or "cloud," refers to a large pool of network-accessible computing resources (such as compute, storage, and networking resources, applications, and services). The cloud can provide convenient, on-demand network access to a shared pool of configurable computing resources that can be programmatically provisioned and released in response to customer commands Cloud computing can thus be considered as both the applications delivered as services over a publicly accessible network (e.g., the Internet, a cellular communication network) and the hardware and software in cloud provider data centers that provide those services. Some customers may desire to use the resources and services of such cloud provider networks, but for various reasons (e.g., latency in communications with customer devices, legal compliance, security, or other reasons) prefer for these resources and services to be provisioned within their own network (for example on premises of the customer), at a separate network managed by the cloud provider, within a network of a communications service provider, or within another independent network.

In some embodiments, segments of a cloud provider network—referred to herein as a "provider substrate extension" (PSE) or "edge location" (EL)—can be provisioned within a network that is separate from the cloud provider network. For example, a cloud provider network typically includes a physical network (e.g., sheet metal boxes, cables, rack hardware) referred to as the substrate. The substrate can be considered as a network fabric containing the physical hardware that runs the services of the provider network. In some implementations, a provider substrate "extension" may be an extension of the cloud provider network substrate formed by one or more servers located on-premise in a customer or partner facility, in a separate cloud provider-managed facility, in a communications service provider facility, or in any other type of facility including servers where such server(s) communicate over a network (e.g., a publicly-accessible network such as the Internet) with a nearby availability zone or region of the cloud provider network. Customers may access a provider substrate extension via the cloud provider substrate or another network and may use the same application programming interfaces (APIs) to create and manage resources in the provider substrate extension as they would use to create and manage resources in the region of a cloud provider network.

As indicated above, one example type of provider substrate extension is one that is formed by servers located on-premise in a customer or partner facility. This type of substrate extension located outside of cloud provider network data centers can be referred to as an "outpost" of the cloud provider network. Another example type of provider substrate extension is one that is formed by servers located in a facility managed by the cloud provider but that includes data plane capacity controlled at least partly by a separate control plane of the cloud provider network.

In some embodiments, yet another example of a provider substrate extension is a network deployed within a communications service provider network. Communications service providers generally include companies that have deployed networks through which end users obtain network connectivity. For example, communications service providers can include mobile or cellular network providers (e.g., operating 3G, 4G, and/or 5G networks), wired internet service providers (e.g., cable, digital subscriber lines, fiber, etc.), and WiFi providers (e.g., at locations such as hotels, coffee shops, airports, etc.). While traditional deployments of computing resources in data centers provide various benefits due to centralization, physical constraints such as the network distance and number of network hops between end user devices and those computing resources can prevent very low latencies from being achieved. By installing or deploying capacity within communications service provider networks, the cloud provider network operator can provide computing resources with dramatically lower access latency to end user devices—in some cases to single-digit millisecond latency. Such low latency access to compute resources is an important enabler to provide improved responsivity for existing cloud-based applications and to enable the next generation of applications for game streaming, virtual reality, real-time rendering, industrial automation, and autonomous vehicles.

As used herein, the computing resources of the cloud provider network installed within a communications service provider network (or possibly other networks) are sometimes also referred to as "cloud provider network edge locations" or simply "edge locations" in that they are closer to the "edge" where end users connect to a network than computing resources in a centralized data center. Such edge locations may include one or more networked computer systems that provide customers of the cloud provider network with computing resources to serve end users with lower latency than would otherwise be achievable if those compute instances were hosted in a data center site. A provider substrate extension deployed in a communication service provider network may also be referred to as a "wavelength zone."

FIG. 1 illustrates an exemplary system including a cloud provider network and further including various provider substrate extensions of the cloud provider network according to some embodiments. A cloud provider network 100 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing platforms to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface (API), software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users (e.g., users 138) can connect to virtualized computing devices and other cloud provider network 100 resources and services using various interfaces 104 (e.g., APIs) via intermediate network(s) 136. An API refers to an interface and/or communication protocol between a client (e.g., an electronic device 134) and a server, such that if the client makes a request in a predefined format, the client should receive a response in a specific format or cause a defined action to be initiated. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

The cloud provider network 100 can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network 100, for example it may not be possible to route from a substrate network address to an address in a production network that runs services of the cloud provider, or to a customer network that hosts customer resources.

The cloud provider network 100 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server 106, a block store server 108, an object store server 110, a control server 112) can have an IP address in the substrate network. Hardware virtualization technology can enable multiple operating systems to run concurrently on a host computer, for example as virtual machines (VMs) on a compute server 106. A hypervisor, or virtual machine monitor (VMM), on a host allocates the host's hardware resources amongst various VMs on the host and monitors the execution of VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network for routing packets between endpoints.

As illustrated, the traffic and operations of the cloud provider network substrate may broadly be subdivided into two categories in various embodiments: control plane traffic carried over a logical control plane 114A and data plane operations carried over a logical data plane 116A. While the data plane 116A represents the movement of user data through the distributed computing system, the control plane 114A represents the movement of control signals through the distributed computing system. The control plane 114A generally includes one or more control plane components or services distributed across and implemented by one or more control servers 112. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane 116A includes customer resources that are implemented on the cloud provider network (e.g., computing instances, containers, block storage volumes, databases, file storage). Data plane traffic generally includes non-administrative operations such as transferring data to and from the customer resources.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the cloud provider network 100 include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane 116A can include one or more compute servers 106, which may be bare metal (e.g., single tenant) or may be virtualized by a hypervisor to run multiple VMs (sometimes referred to as "instances") or microVMs for one or more customers. These compute servers 106 can support a virtualized computing service (or "hardware virtualization service") of the cloud provider network. The virtualized computing service may be part of the control plane 114A, allowing customers to issue commands via an interface 104 (e.g., an API) to launch and manage compute instances (e.g., VMs, containers) for their applications. The virtualized computing service may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane 116A can also include one or more block store servers 108, which can include persistent storage for storing volumes of customer data as well as software for managing these volumes. These block store servers 108 can support a managed block storage service of the cloud provider network. The managed block storage service may be part of the control plane 114A, allowing customers to issue commands via the interface 104 (e.g., an API) to create and manage volumes for their applications running on compute instances. The block store servers 108 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the cloud provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane 116A can also include one or more object store servers 110, which represent another type of storage within the cloud provider network. The object storage servers 110 include one or more servers on which data is stored as objects within resources referred to as buckets and can be used to support a managed object storage service of the cloud provider network. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

A provider substrate extension 102 ("PSE") provides resources and services of the cloud provider network 100 within a separate network, thereby extending functionality of the cloud provider network 100 to new locations (e.g., for reasons related to latency in communications with customer devices, legal compliance, security, etc.). As indicated, such provider substrate extensions 102 can include cloud provider network-managed provider substrate extensions 140 (e.g., formed by servers located in a cloud provider-managed facility separate from those associated with the cloud provider network 100), communications service provider substrate extensions 142 (e.g., formed by servers associated with communications service provider facilities), customer-managed provider substrate extensions 144 (e.g., formed by servers located on-premise in a customer or partner facility), among other possible types of substrate extensions.

As illustrated in the example provider substrate extension 140, a provider substrate extension 102 can similarly include a logical separation between a control plane 118B and a data plane 120B, respectively extending the control plane 114A and data plane 116A of the cloud provider network 100. The provider substrate extension 102 may be pre-configured, e.g. by the cloud provider network operator, with an appropriate combination of hardware with software and/or firmware elements to support various types of computing-related resources, and to do so in a manner that mirrors the experience of using the cloud provider network. For example, one or more provider substrate extension location servers can be provisioned by the cloud provider for deployment within a provider substrate extension 102. As described above, the cloud provider network 100 may offer a set of predefined instance types, each having varying types and quantities of underlying hardware resources. Each instance type may also be offered in various sizes. In order to enable customers to continue using the same instance types and sizes in a provider substrate extension 102 as they do in the region, the servers can be heterogeneous servers. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the servers, that is, while other VMs are still running and consuming other capacity of the provider substrate extension location servers. This can improve utilization of computing resources within the edge location by allowing for better packing of running instances on servers, and also provides a seamless experience regarding instance usage across the cloud provider network 100 and the cloud provider network provider substrate extension.

As illustrated, the provider substrate extension servers can host one or more compute instances 122. Compute instances 122 can be VMs, or containers that package up code and all its dependencies so an application can run quickly and reliably across computing environments (e.g., including VMs). In addition, the servers may host one or more data volumes 124, if desired by the customer. In the region of a cloud provider network 100, such volumes may be hosted on dedicated block store servers. However, due to the possibility of having a significantly smaller capacity at a provider substrate extension 102 than in the region, an optimal utilization experience may not be provided if the provider substrate extension includes such dedicated block store servers. Accordingly, a block storage service may be virtualized in the provider substrate extension 102, such that one of the VMs runs the block store software and stores the data of a volume 124. Similar to the operation of a block storage service in the region of a cloud provider network 100, the volumes 124 within a provider substrate extension 102 may be replicated for durability and availability. The volumes may be provisioned within their own isolated virtual network within the provider substrate extension 102. The compute instances 122 and any volumes 124 collectively make up a data plane extension 120B of the provider network data plane 116A within the provider substrate extension 102.

The servers within a provider substrate extension 102 may, in some implementations, host certain local control plane components 126, for example, components that enable the provider substrate extension 102 to continue functioning if there is a break in the connection back to the cloud provider network 100. Examples of these components include a migration manager that can move compute instances 122 between provider substrate extension servers if needed to maintain availability, and a key value data store that indicates where volume replicas are located. However, generally the control plane 118B functionality for a provider substrate extension will remain in the cloud provider network 100 in order to allow customers to use as much resource capacity of the provider substrate extension as possible.

The migration manager may have a centralized coordination component that runs in region, as well as local controllers that run on the PSE servers (and servers in the cloud provider's data centers). The centralized coordination component can identify target edge locations and/or target hosts when a migration is triggered, while the local controllers can coordinate the transfer of data between the source and target hosts. The described movement of the resources between hosts in different locations may take one of several forms of migration. Migration refers to moving virtual machine instances (and/or other resources) between hosts in a cloud computing network, or between hosts outside of the cloud computing network and hosts within the cloud. There are different types of migration including live migration and reboot migration. During a reboot migration, the customer experiences an outage and an effective power cycle of their virtual machine instance. For example, a control plane service can coordinate a reboot migration workflow that involves tearing down the current domain on the original host and subsequently creating a new domain for the virtual machine instance on the new host. The instance is rebooted by being shut down on the original host and booted up again on the new host.

Live migration refers to the process of moving a running virtual machine or application between different physical machines without significantly disrupting the availability of the virtual machine (e.g., the down time of the virtual machine is not noticeable by the end user). When the control plane executes a live migration workflow it can create a new "inactive" domain associated with the instance, while the original domain for the instance continues to run as the "active" domain. Memory (including any in-memory state of running applications), storage, and network connectivity of the virtual machine are transferred from the original host with the active domain to the destination host with the inactive domain. The virtual machine may be briefly paused to prevent state changes while transferring memory contents to the destination host. The control plane can transition the inactive domain to become the active domain and demote the original active domain to become the inactive domain (sometimes referred to as a "flip"), after which the inactive domain can be discarded.

Techniques for various types of migration involve managing the critical phase—the time when the virtual machine instance is unavailable to the customer—which should be kept as short as possible. In the presently disclosed migration techniques this can be especially challenging, as resources are being moved between hosts in geographically separate locations which may be connected over one or more intermediate networks. For live migration, the disclosed techniques can dynamically determine an amount of memory state data to pre-copy (e.g., while the instance is still running on the source host) and to post-copy (e.g., after the instance begins running on the destination host), based for example on latency between the locations, network bandwidth/usage patterns, and/or on which memory pages are used most frequently by the instance. Further, a particular time at which the memory state data is transferred can be dynamically determined based on conditions of the network between the locations. This analysis may be performed by a migration management component in the region, or by a migration management component running locally in the source edge location. If the instance has access to virtualized storage, both the source domain and target domain can be simultaneously attached to the storage to enable uninterrupted access to its data during the migration and in the case that rollback to the source domain is required.

Server software running at a provider substrate extension 102 may be designed by the cloud provider to run on the cloud provider substrate network, and this software may be enabled to run unmodified in a provider substrate extension 102 by using local network manager(s) 128 to create a private replica of the substrate network within the edge location (a "shadow substrate"). The local network manager(s) 128 can run on provider substrate extension 102 servers and bridge the shadow substrate with the provider substrate extension 102 network, for example, by acting as a virtual private network (VPN) endpoint or endpoints between the provider substrate extension 102 and the proxies 130, 132 in the cloud provider network 100 and by implementing the mapping service (for traffic encapsulation and decapsulation) to relate data plane traffic (from the data plane proxies) and control plane traffic (from the control plane proxies) to the appropriate server(s). By implementing a local version of the provider network's substrate-overlay mapping service, the local network manager(s) 128 allow resources in the provider substrate extension 102 to seamlessly communicate with resources in the cloud provider network 100. In some implementations, a single local network manager can perform these actions for all servers hosting compute instances 122 in a provider substrate extension 102. In other implementations, each of the server hosting compute instances 122 may have a dedicated local network manager In multi-rack edge locations, inter-rack communications can go through the local network managers, with local network managers maintaining open tunnels to one another.

Provider substrate extension locations can utilize secure networking tunnels through the provider substrate extension 102 network to the cloud provider network 100, for example, to maintain security of customer data when traversing the provider substrate extension 102 network and any other intermediate network (which may include the public internet). Within the cloud provider network 100, these tunnels are composed of virtual infrastructure components including isolated virtual networks (e.g., in the overlay network), control plane proxies 130, data plane proxies 132, and substrate network interfaces. Such proxies may be implemented as containers running on compute instances. In some embodiments, each server in a provider substrate extension 102 location that hosts compute instances can utilize at least two tunnels: one for control plane traffic (e.g., Constrained Application Protocol (CoAP) traffic) and one for encapsulated data plane traffic. A connectivity manager (not shown) within the cloud provider network manages the cloud provider network-side lifecycle of these tunnels and their components, for example, by provisioning them automatically when needed and maintaining them in a healthy operating state. In some embodiments, a direct connection between a provider substrate extension 102 location and the cloud provider network 100 can be used for control and data plane communications. As compared to a VPN through other networks, the direct connection can provide constant bandwidth and more consistent network performance because of its relatively fixed and stable network path.

A control plane (CP) proxy 130 can be provisioned in the cloud provider network 100 to represent particular host(s) in an edge location. CP proxies are intermediaries between the control plane 114A in the cloud provider network 100 and control plane targets in the control plane 118B of provider substrate extension 102. That is, CP proxies 130 provide infrastructure for tunneling management API traffic destined for provider substrate extension servers out of the region substrate and to the provider substrate extension 102. For example, a virtualized computing service of the cloud provider network 100 can issue a command to a VMM of a server of a provider substrate extension 102 to launch a compute instance 122. A CP proxy maintains a tunnel (e.g., a VPN) to a local network manager 128 of the provider substrate extension. The software implemented within the CP proxies ensures that only well-formed API traffic leaves from and returns to the substrate. CP proxies provide a mechanism to expose remote servers on the cloud provider substrate while still protecting substrate security materials (e.g., encryption keys, security tokens) from leaving the cloud provider network 100. The one-way control plane traffic tunnel imposed by the CP proxies also prevents any (potentially compromised) devices from making calls back to the substrate. CP proxies may be instantiated one-for-one with servers at a provider substrate extension 102 or may be able to manage control plane traffic for multiple servers in the same provider substrate extension.

A data plane (DP) proxy 132 can also be provisioned in the cloud provider network 100 to represent particular server(s) in a provider substrate extension 102. The DP proxy 132 acts as a shadow or anchor of the server(s) and can be used by services within the cloud provider network 100 to monitor health of the host (including its availability, used/free compute and capacity, used/free storage and capacity, and network bandwidth usage/availability). The DP proxy 132 also allows isolated virtual networks to span provider substrate extensions 102 and the cloud provider network 100 by acting as a proxy for server(s) in the cloud provider network 100. Each DP proxy 132 can be implemented as a packet-forwarding compute instance or container. As illustrated, each DP proxy 132 can maintain a VPN tunnel with a local network manager 128 that manages traffic to the server(s) that the DP proxy 132 represents. This tunnel can be used to send data plane traffic between the provider substrate extension server(s) and the cloud provider network 100. Data plane traffic flowing between a provider substrate extension 102 and the cloud provider network 100 can be passed through DP proxies 132 associated with that provider substrate extension. For data plane traffic flowing from a provider substrate extension 102 to the cloud provider network 100, DP proxies 132 can receive encapsulated data plane traffic, validate it for correctness, and allow it to enter into the cloud provider network 100. DP proxies 132 can forward encapsulated traffic from the cloud provider network 100 directly to a provider substrate extension 102.

Local network manager(s) 128 can provide secure network connectivity with the proxies 130, 132 established in the cloud provider network 100. After connectivity has been established between the local network manager(s) 128 and the proxies, customers may issue commands via the interface 104 to instantiate compute instances (and/or perform other operations using compute instances) using provider substrate extension resources in a manner analogous to the way in which such commands would be issued with respect to compute instances hosted within the cloud provider network 100. From the perspective of the customer, the customer can now seamlessly use local resources within a provider substrate extension (as well as resources located in the cloud provider network 100, if desired). The compute instances set up on a server at a provider substrate extension 102 may communicate both with electronic devices located in the same network as well as with other resources that are set up in the cloud provider network 100, as desired. A local gateway 146 can be implemented to provide network connectivity between a provider substrate extension 102 and a network associated with the extension (e.g., a communications service provider network in the example of a provider substrate extension 142).

There may be circumstances that necessitate the transfer of data between the object storage service and a provider substrate extension 102. For example, the object storage service may store machine images used to launch VMs, as well as snapshots representing point-in-time backups of volumes. The object gateway can be provided on a PSE server or a specialized storage device, and provide customers with configurable, per-bucket caching of object storage bucket contents in their PSE to minimize the impact of PSE-region latency on the customer's workloads. The object gateway can also temporarily store snapshot data from snapshots of volumes in the PSE and then sync with the object servers in the region when possible. The object gateway can also store machine images that the customer designates for use within the PSE or on the customer's premises. In some implementations, the data within the PSE may be encrypted with a unique key, and the cloud provider can limit keys from being shared from the region to the PSE for security reasons. Accordingly, data exchanged between the object store servers and the object gateway may utilize encryption, decryption, and/or re-encryption in order to preserve security boundaries with respect to encryption keys or other sensitive data. The transformation intermediary can perform these operations, and a PSE bucket can be created (on the object store servers) to store snapshot and machine image data using the PSE encryption key.

In the manner described above, a PSE 102 forms an edge location, in that it provides the resources and services of the cloud provider network outside of a traditional cloud provider data center and closer to customer devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as "far zones" (due to being far from other availability zones) or "near zones" (due to being near to customer workloads). A near zone may be connected in various ways to a publicly accessible network such as the Internet, for example directly, via another network, or via a private connection to a region. Although typically a near zone would have more limited capacity than a region, in some cases a near zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-access edge computing (MEC) site having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone of the provider network. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

Figure 2:
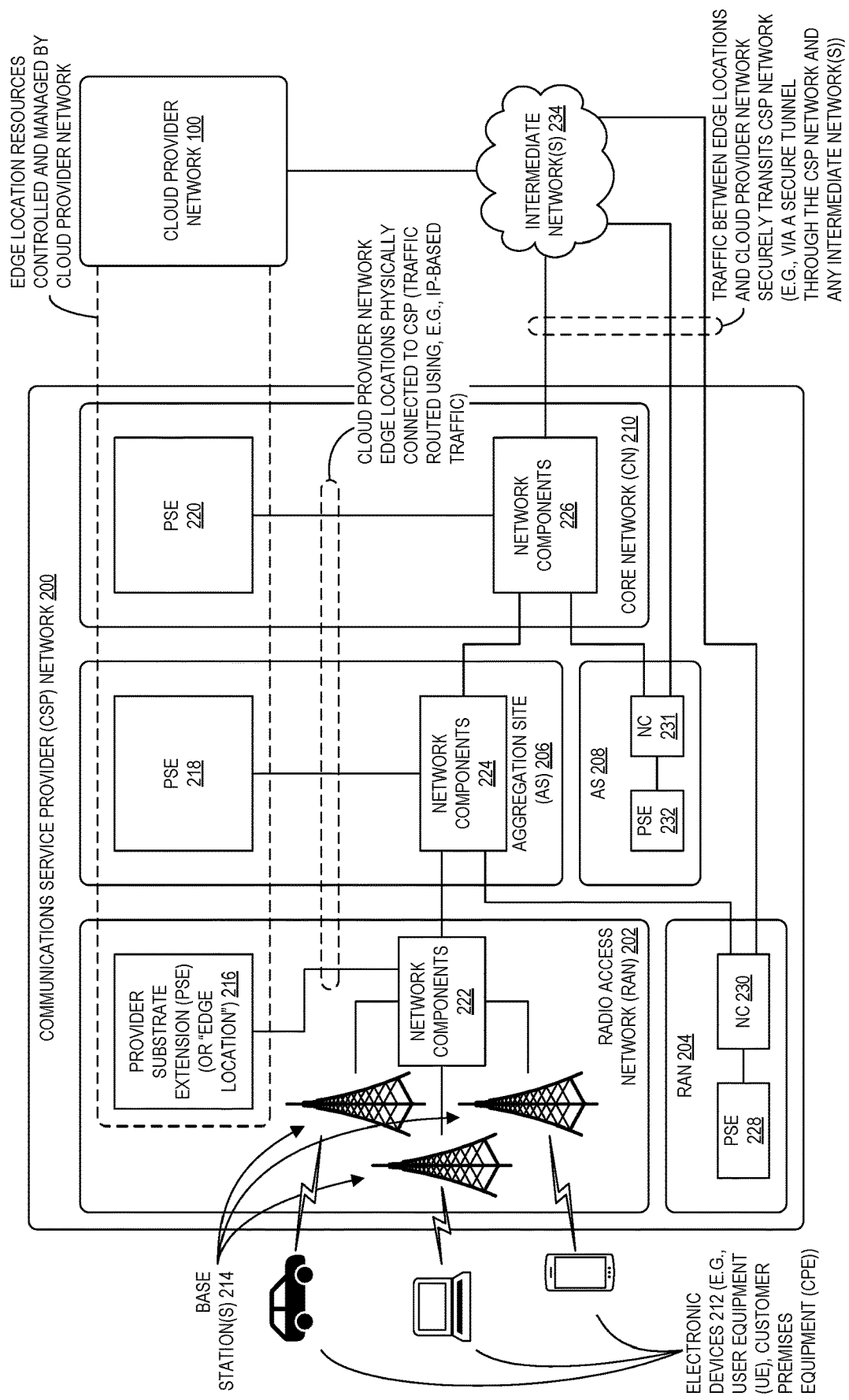
FIG. 2 illustrates an exemplary system in which cloud provider network substrate extensions are deployed within a communications service provider network according to some embodiments.

FIG. 2 illustrates an exemplary system in which cloud provider network edge locations are deployed within a communications service provider network according to some embodiments. A communications service provider (CSP) network 200 generally includes a downstream interface to end user electronic devices and an upstream interface to other networks (e.g., the interna). In this example, the CSP network 200 is a wireless "cellular" CSP network that includes radio access networks (RAN) 202, 204, aggregation sites (AS) 206, 208, and a core network (CN) 210. The RANs 202, 204 include base stations (e.g., NodeBs, eNodeBs, gNodeBs) that provide wireless connectivity to electronic devices 212. The core network 210 typically includes functionality related to the management of the CSP network (e.g., billing, mobility management, etc.) and transport functionality to relay traffic between the CSP network and other networks. Aggregation sites 206, 208 can serve to consolidate traffic from many different radio access networks to the core network and to direct traffic originating from the core network to the various radio access networks.

From left to right in FIG. 2, end user electronic devices 212 wirelessly connect to base stations (or radio base stations) 214 of a radio access network 202. Such electronic devices 212 are sometimes referred to as user equipment (UE) or customer premises equipment (CPE). Data traffic is often routed through a fiber transport network consisting of multiple hops of layer 3 routers (e.g., at aggregation sites) to the core network 210. The core network 210 is typically housed in one or more data centers. For data traffic destined for locations outside of the CSP network 200, the network components 222-226 typically include a firewall through which traffic can enter or leave the CSP network 200 to external networks such as the internet or a cloud provider network 100. Note that in some embodiments, the CSP network 200 can include facilities to permit traffic to enter or leave from sites further downstream from the core network 210 (e.g., at an aggregation site or RAN).

Provider substrate extensions 216-220 include computing resources managed as part of a cloud provider network but installed or sited within various points of a CSP network (e.g., on premise in a CSP owned or leased space). The computing resources typically provide some amount of compute and memory capacity that the cloud provider can allocate for use by its customers. The computing resources can further include storage and accelerator capacity (e.g., solid-state drives, graphics accelerators, etc.). Here, provider substrate extensions 216, 218, and 220 are in communication with a cloud provider network 100.

Typically, the further—e.g., in terms of network hops and/or distance—a provider substrate extension is from the cloud provider network 100 (or closer to electronic devices 212), the lower the network latency is between computing resources within the provider substrate extension and the electronic devices 212. However, physical site constraints often limit the amount of provider substrate extension location computing capacity that can be installed at various points within the CSP or determine whether computing capacity can be installed at various points at all. For example, a provider substrate extension sited within the core network 210 can typically have a much larger footprint (in terms of physical space, power requirements, cooling requirements, etc.) than a provider substrate extension sited within the RAN 202, 204.

The installation or siting of provider substrate extensions within a CSP network can vary subject to the particular network topology or architecture of the CSP network. As indicated in FIG. 2, provider substrate extensions can generally be connected anywhere the CSP network can break out packet-based traffic (e.g., IP based traffic). Additionally, communications between a given provider substrate extension and the cloud provider network 100 typically securely transit at least a portion of the CSP network 200 (e.g., via a secure tunnel, virtual private network, a direct connection, etc.). In the illustrated example, the network components 222 facilitate the routing of data traffic to and from a provider substrate extension 216 integrated with the RAN 202, the network components 224 facilitate the routing of data traffic to and from an provider substrate extension 218 integrated with the AS 206, and the network components 226 facilitate the routing of data traffic to and from a provider substrate extension 220 integrated with the CN 210. Network components 222-226 can include routers, gateways, or firewalls. To facilitate routing, the CSP can allocate one or more IP addresses from the CSP network address space to each of the edge locations.

In 5G wireless network development efforts, edge locations may be considered a possible implementation of Multi-access Edge Computing (MEC). Such edge locations can be connected to various points within a CSP 5G network that provide a breakout for data traffic as part of the User Plane Function (UPF). Older wireless networks can incorporate edge locations as well. In 3G wireless networks, for example, edge locations can be connected to the packet-switched network portion of a CSP network, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC).

In some embodiments, traffic between a provider substrate extension 228 and the cloud provider network 100 can be broken out of the CSP network 200 without routing through the core network 210. For example, network components 230 of a RAN 204 can be configured to route traffic between a provider substrate extension 216 of the RAN 204 and the cloud provider network 100 without traversing an aggregation site or core network 210. As another example, network components 231 of an aggregation site 208 can be configured to route traffic between a provider substrate extension 232 of the aggregation site 208 and the cloud provider network 100 without traversing the core network 210. The network components 230, 231 can include a gateway or router having route data to direct traffic from the edge location destined for the cloud provider network 100 to the cloud provider network 100 (e.g., through a direct connection or an intermediate network 234) and to direct traffic from the cloud provider network 100 destined for the provider substrate extension to the provider substrate extension.

In some embodiments, provider substrate extensions can be connected to more than one CSP network. For example, when two CSPs share or route traffic through a common point, a provider substrate extension can be connected to both CSP networks. For example, each CSP can assign some portion of its network address space to the provider substrate extension, and the provider substrate extension can include a router or gateway that can distinguish traffic exchanged with each of the CSP networks. For example, traffic destined for the provider substrate extension from one CSP network might have a different destination IP address, source IP address, and/or virtual local area network (VLAN) tag than traffic received from another CSP network. Traffic originating from the provider substrate extension to a destination on one of the CSP networks can be similarly encapsulated to have the appropriate VLAN tag, source IP address (e.g., from the pool allocated to the provider substrate extension from the destination CSP network address space) and destination IP address.

Note that while the exemplary CSP network architecture of FIG. 2 includes radio access networks, aggregation sites, and a core network, the architecture of a CSP network can vary in naming and structure across generations of wireless technology, between different CSPs, as well as between wireless and fixed-line CSP networks. Additionally, while FIG. 2 illustrates several locations where an edge location can be sited within a CSP network, other locations are possible (e.g., at a base station).

Figure 3:
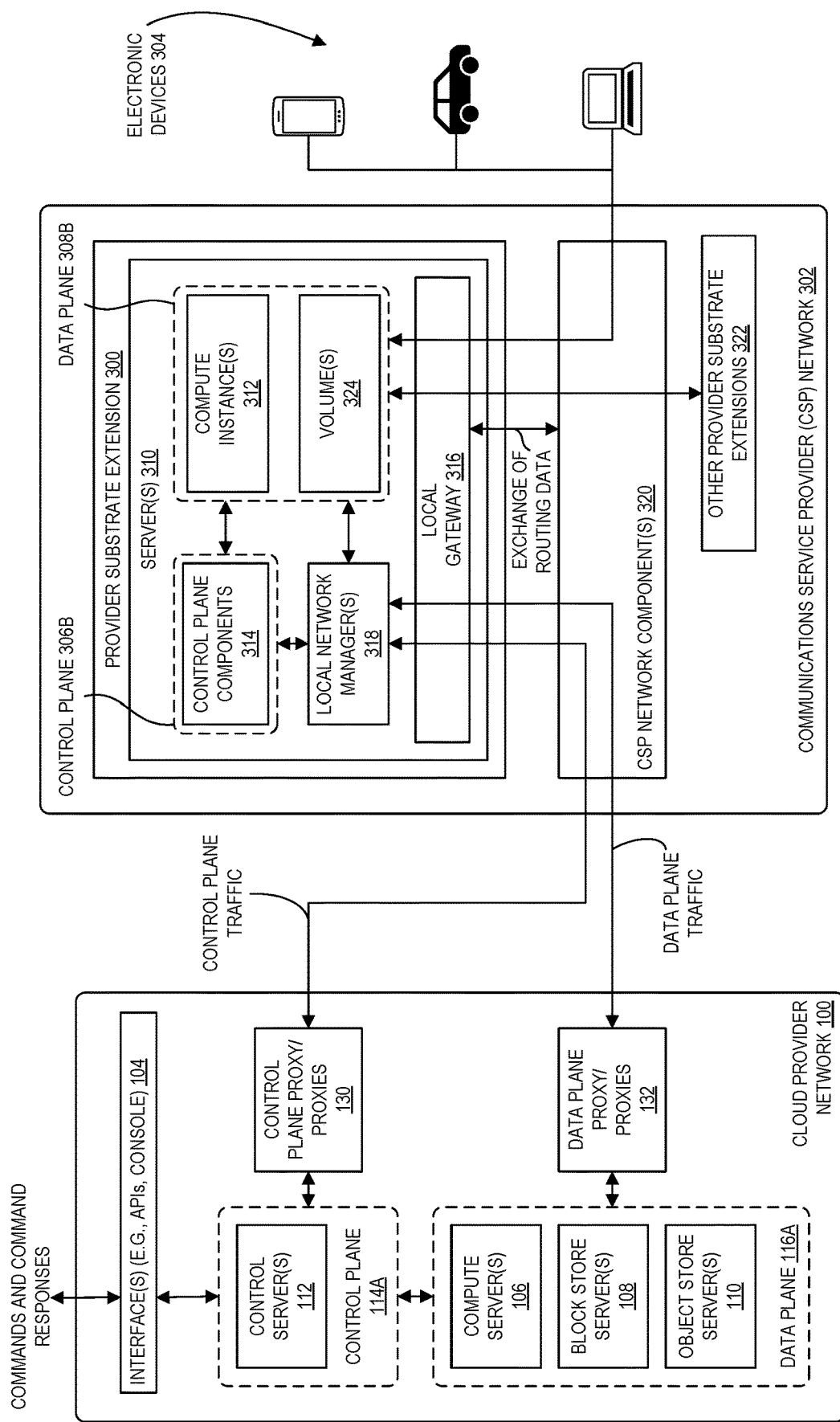
FIG. 3 illustrates in greater detail exemplary components of and connectivity between a cloud provider network and a provider substrate extension within a communications service provider network according to some embodiments.

FIG. 3 illustrates in greater detail exemplary components of and connectivity between a cloud provider network and a provider substrate extension within a communications service provider network according to some embodiments. A provider substrate extension 300 provides resources and services of the cloud provider network within a CSP network 302 thereby extending functionality of the cloud provider network 100 to be closer to end user devices 304 connected to the CSP network.

The provider substrate extension 300 similarly includes a logical separation between a control plane 306B and a data plane 308B, respectively extending the control plane 114A and data plane 116A of the cloud provider network 100. The provider substrate extension 300 may be pre-configured, e.g. by the cloud provider network operator, with an appropriate combination of hardware with software and/or firmware elements to support various types of computing-related resources, and to do so in a manner that mirrors the experience of using the cloud provider network. For example, one or more provider substrate extension location servers 310 can be provisioned by the cloud provider for deployment within the CSP network 302.

The servers 310 within a provider substrate extension 300 may, in some implementations, host certain local control plane components 314, for example, components that enable the provider substrate extension 300 to continue functioning if there is a break in the connection back to the cloud provider network 100. Further, certain controller functions may typically be implemented locally on data plane servers, even in the cloud provider datacenters—for example a function for collecting metrics for monitoring instance health and sending them to a monitoring service, and a function for coordinating transfer of instance state data during live migration. However, generally the control plane 306B functionality for a provider substrate extension 300 will remain in the cloud provider network 100 in order to allow customers to use as much resource capacity of the provider substrate extension as possible.

As illustrated, the provider substrate extension servers 310 can host compute instances 312. Compute instances can be VMs, microVMs, or containers that package up code and all its dependencies so an application can run quickly and reliably across computing environments (e.g., including VMs). Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

In some embodiments, the execution of edge-optimized compute instances is supported by a lightweight virtual machine manager (VMM) running on the servers 310 upon which edge-optimized compute instances are launched based on application profiles. These VMMs enable the launch of lightweight micro-virtual machines (microVMs) in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

In addition, the servers 310 may host one or more data volumes 324, if desired by the customer. The volumes may be provisioned within their own isolated virtual network within the provider substrate extension 300. The compute instances 312 and any volumes 324 collectively make up a data plane extension 308B of the provider network data plane 116A within the provider substrate extension 300.

A local gateway 316 can be implemented to provide network connectivity between the provider substrate extension 300 and the CSP network 302. The cloud provider can configure the local gateway 316 with an IP address on the CSP network 302 and to exchange routing data (e.g., via the Border Gateway Protocol (BGP)) with the CSP network components 320. The local gateway 316 can include one or more route tables that control the routing of inbound traffic to the provider substrate extension 300 and outbound traffic leaving the provider substrate extension 300. The local gateway 316 can also support multiple VLANs in cases where the CSP network 302 uses separate VLANs for different portions of the CSP network 302 (e.g., one VLAN tag for the wireless network and another VLAN tag for a fixed network).

In some embodiments of a provider substrate extension 300, the extension includes one or more switches, sometimes referred to top of rack (TOR) switches (e.g., in rack-based embodiments). The TOR switches are connected to CSP network routers (e.g., CSP network components 320), such as Provider Edge (PE) or Software Defined Wide Area Network (SD-WAN) routers. Each TOR switch can include an uplink Link Aggregation (LAG) interface to the CSP network router supporting multiple physical links per LAG (e.g., 1G/10G/40G/100G). The links can run Link Aggregation Control Protocol (LACP) and be configured as IEEE802.1q trunks to enable multiple VLANs over the same interface. Such a LACP-LAG configuration allows an edge location management entity of the control plane of the cloud provider network 100 to add more peering links to an edge location without adjustments to routing. Each of the TOR switches can establish eBGP sessions with the carrier PE or SD-WAN routers. The CSP can provide a private Autonomous System Number (ASN) for the edge location and an ASN of the CSP network 302 to facilitate the exchange of routing data.

Data plane traffic originating from the provider substrate extension 300 can have a number of different destinations. For example, traffic addressed to a destination in the data plane 116A of the cloud provider network 100 can be routed via the data plane connection between the provider substrate extension 300 and the cloud provider network 100. The local network manager 318 can receive a packet from a compute instance 312 addressed to, for example, another compute instance in the cloud provider network 100 and encapsulate the packet with a destination as the substrate IP address of the server hosting the other compute instance before sending it to the cloud provider network 100 (e.g., via a direct connection or tunnel). For traffic from a compute instance 312 addressed to another compute instance hosted in another provider substrate extension 322, the local network manager 318 can encapsulate the packet with a destination as the IP address assigned to the other provider substrate extension 322, thereby allowing the CSP network components 320 to handle the routing of the packet. Alternatively, if the CSP network components 320 do not support inter-edge location traffic, the local network manager 318 can address the packet to a relay in the cloud provider network 100 that can send the packet to the other provider substrate extension 322 via its data plane connection (not shown) to the cloud provider network 100. Similarly, for traffic from a compute instance 312 address to a location outside of the CSP network 302 or the cloud provider network 100 (e.g., on the internet), if the CSP network components 320 permit routing to the internet, the local network manager 318 can encapsulate the packet with a source IP address corresponding to the IP address in the carrier address space assigned to the compute instance 312. Otherwise, the local network manager 318 can send the packet to an Internet Gateway in the cloud provider network 100 that can provide internet connectivity for the compute instance 312. For traffic from a compute instance 312 addressed to an electronic device 304, the local gateway 316 can use Network Address Translation (NAT) to change the source IP address of the packet from an address in an address space of the cloud provider network to an address space of the carrier network.

The local gateway 316, local network manager(s) 318, and other local control plane components 314 may run on the same servers 310 that host compute instances 312, may run on a dedicated processor (e.g., on an offload card) integrated with edge location servers 310, or can be executed by servers separate from those that host customer resources.

Figure 4:
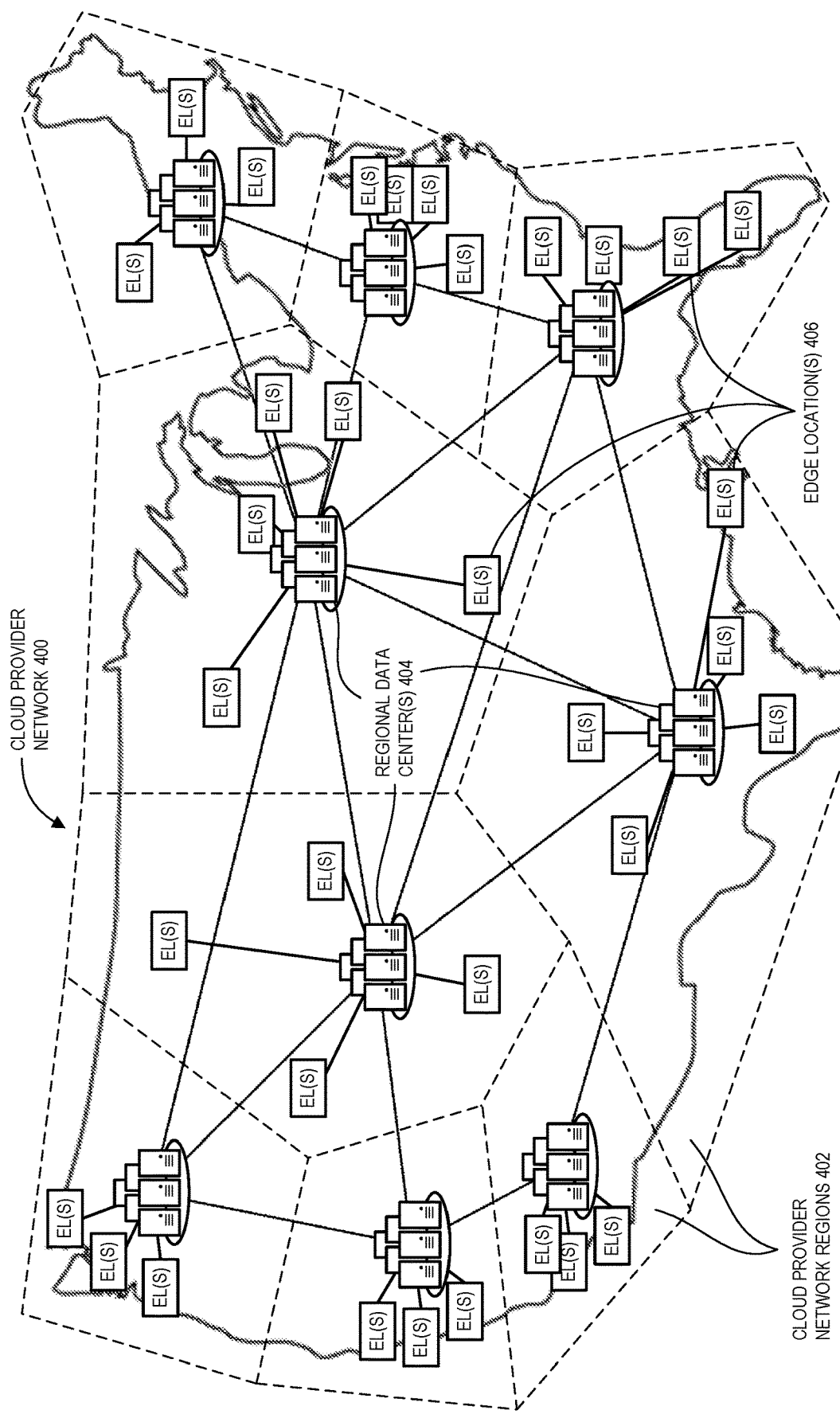
FIG. 4 illustrates an exemplary cloud provider network including geographically dispersed provider substrate extensions (or "edge locations") according to some embodiments.

FIG. 4 illustrates an exemplary cloud provider network including geographically dispersed provider substrate extensions (or "edge locations") according to some embodiments. As illustrated, a cloud provider network 400 can be formed as a number of regions 402, where a region is a separate geographical area in which the cloud provider has one or more data centers 404. Each region 402 can include two or more availability zones (AZs) connected to one another via a private high-speed network such as, for example, a fiber communication connection. An availability zone refers to an isolated failure domain including one or more data center facilities with separate power, separate networking, and separate cooling relative to other availability zones. A cloud provider may strive to position availability zones within a region far enough away from one other such that a natural disaster, widespread power outage, or other unexpected event does not take more than one availability zone offline at the same time. Customers can connect to resources within availability zones of the cloud provider network via a publicly accessible network (e.g., the Internet, a cellular communication network, a CSP network). Transit Centers (TC) are the primary backbone locations linking customers to the cloud provider network and may be co-located at other network provider facilities (e.g., Internet service providers, telecommunications providers). Each region can operate two or more TCs for redundancy.

In comparison to the number of regional data centers or availability zones, the number of edge locations 406 can be much higher. Such widespread deployment of edge locations 406 can provide low-latency connectivity to the cloud for a much larger group of end user devices (in comparison to those that happen to be very close to a regional data center). In some embodiments, each edge location 406 can be peered to some portion of the cloud provider network 400 (e.g., a parent availability zone or regional data center). Such peering allows the various components operating in the cloud provider network 400 to manage the compute resources of the edge location. In some cases, multiple edge locations may be sited or installed in the same facility (e.g., separate racks of computer systems) and managed by different zones or data centers to provide additional redundancy. Note that although edge locations are typically depicted herein as within a CSP network, in some cases, such as when a cloud provider network facility is relatively close to a communications service provider facility, the edge location can remain within the physical premises of the cloud provider network while being connected to the communications service provider network via a fiber or other network link.

An edge location 406 can be structured in several ways. In some implementations, an edge location 406 can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers, instead of the edge location infrastructure described herein.

As indicated herein, a cloud provider network can be formed as a number of regions, where each region represents a geographical area in which the cloud provider clusters data centers. Each region can further include multiple (e.g., two or more) availability zones (AZs) connected to one another via a private high-speed network, for example, a fiber communication connection. An AZ may provide an isolated failure domain including one or more data center facilities with separate power, separate networking, and separate cooling from those in another AZ. Preferably, AZs within a region are positioned far enough away from one other that a same natural disaster (or other failure-inducing event) should not affect or take more than one AZ offline at the same time. Customers can connect to an AZ of the cloud provider network via a publicly accessible network (e.g., the Internet, a cellular communication network).

The parenting of a given edge location to an AZ or region of the cloud provider network can be based on a number of factors. One such parenting factor is data sovereignty. For example, to keep data originating from a CSP network in one country within that country, the edge locations deployed within that CSP network can be parented to AZs or regions within that country. Another factor is availability of services. For example, edge locations may have different hardware configurations such as the presence or absence of components such as local non-volatile storage for customer data (e.g., solid state drives), graphics accelerators, etc. Some AZs or regions might lack the services to exploit those additional resources, thus, an edge location could be parented to an AZ or region that supports the use of those resources. Another factor is the latency between the AZ or region and the edge location. While the deployment of edge locations within a CSP network has latency benefits, those benefits might be negated by parenting an edge location to a distant AZ or region that introduces significant latency for edge location to region traffic. Accordingly, edge locations are often parented to nearby (in terms of network latency) AZs or regions.

Figure 5:
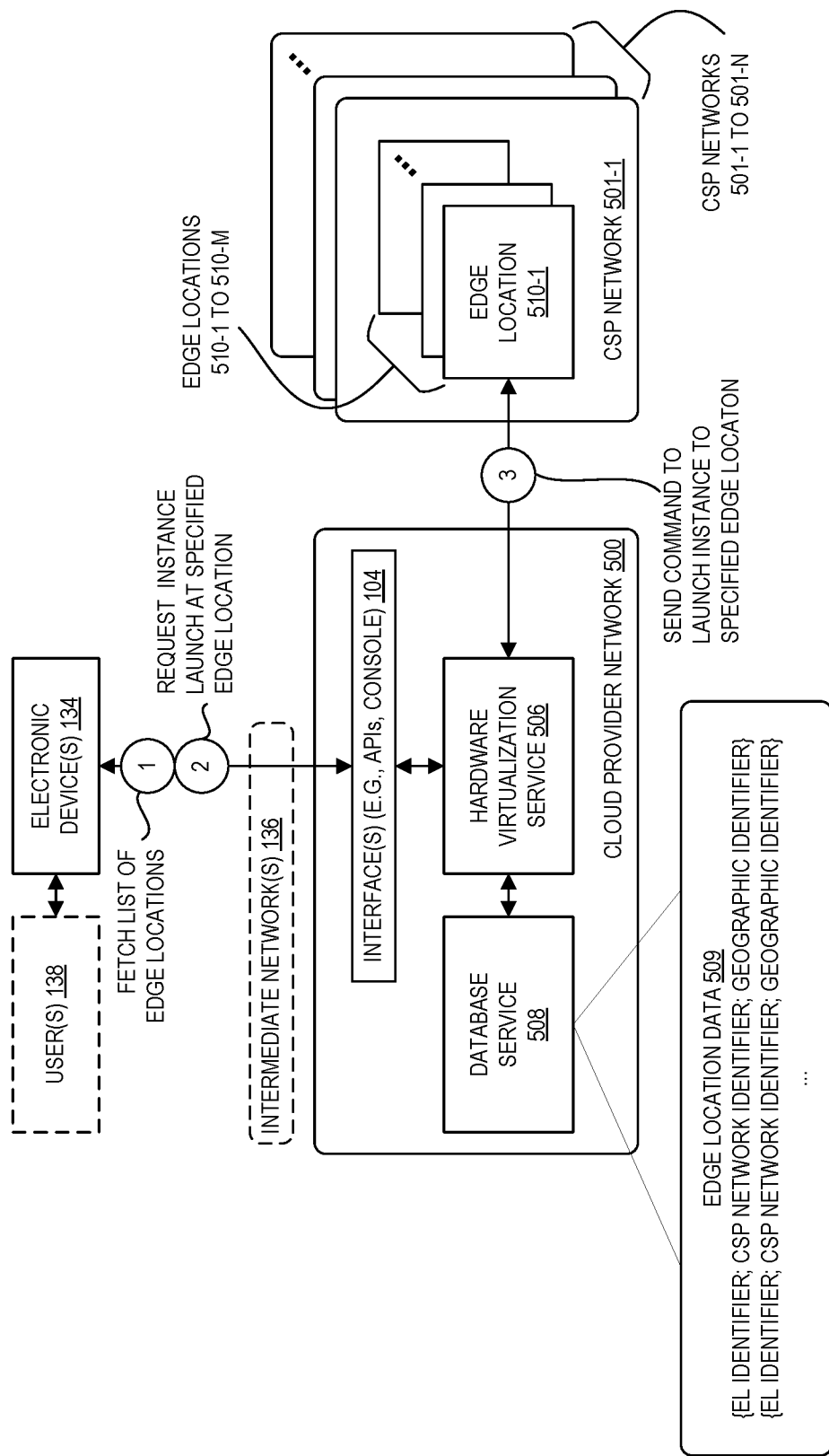
FIG. 5 illustrates an exemplary environment in which compute instances are launched in cloud provider network edge locations according to some embodiments.

FIG. 5 illustrates an exemplary environment in which compute instances are launched in cloud provider network edge locations according to some embodiments. As illustrated, a cloud provider network 500 includes a hardware virtualization service 506 and a database service 508. The cloud provider network 500 has multiple edge locations 510. In this example, multiple edge locations 510 are deployed in each of one or more CSP networks 501. Edge locations 510-1 through 510-M are deployed in CSP network 501-1, while other edge locations (not shown) can be deployed in other CSP networks (e.g., 501-2 through 501-N). CSP networks 501 may be different networks or network slices of the same CSP or networks of different CSPs.

The numbered circles "1" through "3" of FIG. 5 illustrate an exemplary process through which a user 138 (e.g., a customer of the cloud provider network) can launch a compute instance at one of the edge locations 510. At circle "1" of FIG. 5, the user 138 requests an identification of available edge locations using an electronic device 134. As indicated above, communications between electronic device(s) 134 and the provider network 100, such as a request for an identification of edge locations to launch an instance at an edge location, can be routed through interface(s) 104, such as through use of application programming interface (API) calls, via a console implemented as a website or application, and so forth. In addition to serving as a frontend to control plane services, the interface(s) 104 can perform operations such as verifying the identity and permissions of the user initiating a request, evaluating the request and routing it to the appropriate control plane services, and the like.

The request for an identification of edge locations may include zero or more parameters to filter, limit, or otherwise constrain the set of returned edge locations to less than all edge locations 510. For example, one such parameter could be an identification of a particular CSP (e.g., when the cloud provider network 500 has integrated edge locations with multiple CSPs). Another such parameter is an identification of a particular network of a CSP (e.g., if the CSP has edge locations for a 4G network, 5G network, etc.). Another such parameter might limit the returned edge locations to those having certain hardware support (e.g., accelerators). Another such parameter could limit the returned edge locations to those near or within some distance of some geographic indicator (e.g., a city, state, zip code, geo-coordinate, etc.).

In the illustrated embodiment, the request is processed by the hardware virtualization service 506. Upon receipt of the request, the hardware virtualization service 506 fetches the identity of the edge locations, if any, that satisfy the request from edge location data 509. Exemplary edge location data 509 may be stored in a database provided by the database service 508. Edge location data 509 can include, for each edge location, an identifier assigned to the edge location, an indication or identifier of the CSP network within which the edge location is deployed, and an indication or identifier of a geographic location of the edge location. As an example, a user might request an identification of edge locations within 10 miles of New York City on CSP Company X's 5G network. Upon identifying the edge locations that satisfy the user's request, the hardware virtualization service 506 returns the list or set of edge locations to the electronic device 134.

At circle "2" of FIG. 5, the user 138 requests a launch of a compute instance at a specified edge location. Such a request may include various parameters such as the type of instance to launch. Upon receipt of the request, the hardware virtualization service 506 can check to ensure that the specified edge location has sufficient capacity to launch the instance amongst other operations. Note that in some embodiments, the hardware virtualization service 506 may avoid returning edge locations at or near full resource capacity in response to the user's request at circle "1" to avoid rejecting the request at circle "2."

At circle "3" of FIG. 5, the hardware virtualization service 506 issues a control plane command to the specified edge location to launch the requested compute instance (e.g., via a proxy 130). For example, the hardware virtualization service 407 can then issue a command to a VMM on the edge location or edge location server to launch a compute instance for the customer.

As a high number of edge locations may be deployed, it may be difficult for the customer to manually identify and select edge locations suitable for their application(s). Under the approaches described with reference to FIGS. 6 and 7, the selection of edge locations to host compute instance(s) can be performed by components of the cloud provider network.

Figure 6:
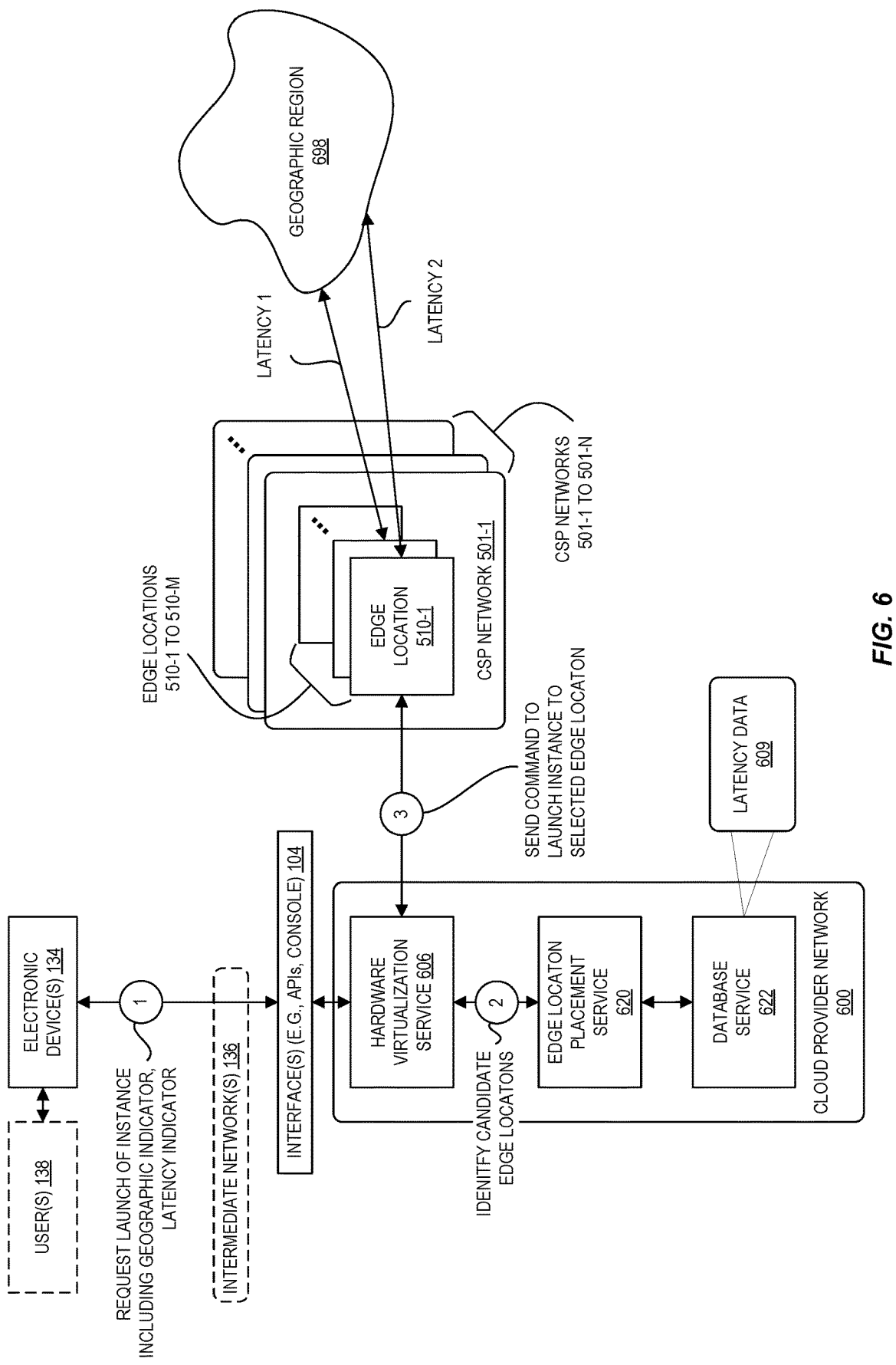
FIG. 6 illustrates another exemplary environment in which compute instances are launched in cloud provider network edge locations according to some embodiments.

FIG. 6 illustrates another exemplary environment in which virtualized compute resources (including VMs, microVMs, and/or containers) are launched in cloud provider network edge locations according to some embodiments. As illustrated, a cloud provider network 600 includes a hardware virtualization service 606, an edge location placement service 620, and a database service 622. The cloud provider network 600 has multiple edge locations 510 in various CSP networks 501 (e.g., such as described above with reference to FIG. 5).

The numbered circles "1" through "3" of FIG. 6 illustrate an exemplary process through which a user 138 (e.g., a customer of the cloud provider network) can launch a compute instance at one of the edge locations 510. At circle "1" of FIG. 6, the user 138 issues a request to launch a compute instance to the hardware virtualization service 606. Here, the parameters of the request can include a geographic indicator and an indication of a latency constraint or requirement. The geographic indicator may take a variety of forms depending on the implementation (e.g., a geocoordinate, a zip code, a metropolitan area, etc.). For example, the geographic identifier might be a zip code associated with a region 698, a coordinate within region 698, an area (e.g., city limits) corresponding to region 698, etc. The latency indicator may be specified in terms of time (e.g., less than 10 milliseconds) between devices associated with the geographic indicator (e.g., in the region 698) and the server ultimately selected to host the requested compute instance.

More complicated launch requests from the user 138 may include parameters specifying additional latency requirements. For example, the request may specify a latency requirement for communications both between the requested instance and devices associated with the geographic indicator (e.g., within a region) and between the requested instance and the cloud provider network region or availability zone to which the edge location ultimately selected to host the instance is parented. As another example, the request may request multiple instances spread across multiple edge locations, specifying latency requirements for communications both between the requested instance and devices associated with the geographic indicator and amongst the edge locations.

Additional launch request parameters can include the number of compute instances to launch, the type of compute instances, whether the compute instances (in the case of multiple) should be packed close together (e.g., on the same server or edge location) or spread out (e.g., across servers or edge locations).

As in the approach described with reference to FIG. 5, additional launch parameters can be provided to limit the search for suitable edge locations by the edge location placement service 720 (e.g., a parameter identifying a particular CSP or a particular network of a CSP, parameters identifying hardware requirements for the edge location, etc.).

In some embodiments, the parameters constraining the requested launch at circle "1" of FIG. 6 can be stored as part of an application profile. Application profiles can include parameters related to execution of user workloads at provider substrate extensions (e.g., including desired amounts of computing resources to be devoted to instances launched based on a profile, desired latency and geographic constraints for launched instances, instance placement and scaling configurations, etc.). A cloud provider network customer may have previously created an application profile that can be later referenced such as in the request to launch an instance at circle "1."

In some embodiments, one parameter value that can be included in an application profile is a value identifying a resource to be used as a template to launch compute instances based on the application profile. For example, if a user has created a VM image, a virtual appliance, a container image, or any other type of resource that can be used to launch compute instances (such as, for example, VMs, microVMs, containers, etc.), a user can provide an identifier of the resource (e.g., an identifier of the resource known to the cloud provider network 100). In some embodiments, a user can provide an identifier of a storage location storing a resource that can be used to launch compute instances (e.g., a URL or other identifier of a storage location within the cloud provider network 100 or elsewhere storing the resource).

In some embodiments, another example parameter that can be specified in an application profile includes parameters related to computing resources to be devoted to instances launched based on the profile. For example, users can specify resource constraints in terms of CPU, memory, networking performance, or any other resource related parameters (e.g., a user might specify that instances to be launched based on an application profile are allocated two vCPUs, 8 GiB of memory, up to 10 Gbps of networking, or any other combination of resources), such that instances launched based on the application profile are provided with the requested resources (assuming the requested resources are available at any provider substrate extension locations satisfying other application profile constraints). In some embodiments, users may specify resource constraints in terms of defined instance types (e.g., instance types associated with defined amounts of CPU, memory, networking, etc., resources as defined by the cloud provider network 100). Other resource-related parameters can include block device mappings to be used by launched instances, kernel versions, and the like.

In some embodiments, other example parameters include parameters relate to other aspects of placing edge-optimized instances at provider substrate extensions. For example, one communication service provider-related parameter that can specified includes an identification of particular communication service providers (e.g., to indicate that a user desires for instances to be launched at provider substrate extensions associated with communication service provider A or communication service provider B, but not at provider substrate extensions associated with communication service provider C). Yet another example communication service provider-related parameter that can be specified includes one or more particular geographic locations at which it is desired for edge-optimized instances to be launched (e.g., at provider substrate extensions near downtown Austin, at provider substrate extensions near the San Francisco Bay Area, at provider substrate extensions in a southwest region or northeast region, etc.). Yet another example parameter includes a latency profile for execution of the user's workload at provider substrate extensions, where a latency profile generally indicates desired latency for edge-optimized instances relative to end users or between other network points (e.g., at PSEs having 20 millisecond latency or less to end users, at PSEs near Los Angeles having 30 milliseconds or less to end users, etc.).

In some embodiments, yet other example parameters that can be specified in an application profile include various networking configurations. For example, to enable for communication between an in-region application running in a private network and an application running in a provider substrate extension, an application profile configuration may be specified so that a private network endpoint is provided to the in-region private network to make calls out to the edge-optimized instance. To enable bidirectional communication, customers can also provide a private network endpoint to their provider substrate extension application which can be used to communicate from the provider substrate extensions to the region.

In some embodiments, yet other example parameters that may be specified in an application profile include scaling policies to be used once one more instances have been launched based on the application profile. For example, users can specify scale-in and scale-out policies in an application profile for their applications, where such policies enable adjusting capacity in and across provider substrate extension locations. In some embodiments, when scaling in, new capacity defaults to being launched in the same location that is under load and expands to other locations as long as they fulfill the client latency constraints, if there are any. If no client latency constraints are specified, for example, new capacity may be added in the same location that is under load and expand to other locations until a monitored metric is below the scaling threshold.

At circle "2" of FIG. 6, the hardware virtualization service 606 requests an identification of candidate edge locations 510 from the edge location placement service 620 that satisfy the parameters of the user's launch request. The edge location placement service 622 can evaluate parameters against latency data 609. Typically, the latency data 609 provides an indication of latencies between points within a CSP network 501 (e.g., base stations providing connectivity within the region 698 and edge locations 510) and possibly between points within a CSP network 501 and points in the cloud provider network 600 (e.g., compute instances hosted by servers in a cloud provider network data center). The latency data 609 can further include geographic data about the locations of various access points to the CSP network 501 to allow the edge location placement service 620 to correlate the user-specified geographic indicator to CSP network(s) (e.g., coverage areas of base stations or other equipment through which electronic devices access the CSP network 501). Access points (sometimes referred to as entry points) include devices through which CSP subscriber devices connect to the CSP network (e.g., such as base stations). The latency data 609 can be derived in a number of ways, several of which are described below. As illustrated, the latency data 609 is stored in a database hosted by a database service 622. In other embodiments, latency data 609 may be obtained from a service of the CSP network (e.g., rather than query the database of the database service 622, the edge location placement service 620 queries the service of the CSP network).

Upon receipt of a request for suitable edge locations that satisfy a customer's requirements from the hardware virtualization service 606, the edge location placement service 622 can access the latency data 609 to identify which edge locations satisfy those requirements. An example is illustrative. Assume the user has provided a geographic indicator corresponding to the region 698. A wireless CSP network 501 might include numerous base stations, some of which provide coverage to the geographic region 698. The routing between those base stations and edge locations 510 may vary (e.g., some may have to traverse aggregation sites such as the aggregation site 206, some may have additional hops in the network path from the base station to an edge location, etc.). The latency data can include point-to-point latencies between base stations and edge locations, and the edge location placement service 620 can identify the set of candidate edge locations that have communications latencies that satisfy the customer's latency constraint based on those latencies. For example, the edge location placement service 620 may determine that latency 1 to edge location 510-1 satisfies the customer's constraint while latency 2 to another edge location 510 does not. Accordingly, the edge location placement service 620 would return edge location 510-1 as a candidate edge location to the hardware virtualization service 606.

In addition to identifying edge locations that satisfy the customer's latency requirements, the edge location placement service 622 can further narrow the suitable edge locations by the customer's other parameters, if specified (e.g., edge locations for a particular CSP, particular network of the CSP, etc.).

Based on the candidate edge locations, if any, returned by the edge location placement service 620, the hardware virtualization service 606 can either return an error to the customer if the request could not be satisfied or proceed with the launch of compute instance(s). The request may fail, for example, if no edge locations satisfy the customer's latency requirements or if the customer has requested N compute instances spread across N edge locations but less than N edge locations satisfy the customer's latency requirements. Assuming the customer's request could be satisfied, the hardware virtualization service 606 can issue control plane command(s) to the edge location(s) to launch the requested instance(s), as indicated at circle "3" of FIG. 6 (e.g., see above description of circle "3" for FIG. 5).

In some cases, the number of suitable edge locations returned by the edge location placement service 622 may exceed the number of compute instances requested by the customer. In such cases, the hardware virtualization service 606 can proceed with additional selection criteria to select which of the suitable edge locations will be used to host the customer's requested compute instance(s). The hardware virtualization service 606 can employ some cost function based on the various criteria to score each of the suitable edge locations and select the "best" edge location based on its score relative to the score of other edge locations. One such criteria is the cost of capacity—a PSE deployed in Manhattan might have a higher monetary cost (e.g., based on providing lower latency to users in Manhattan, N.Y. or increased demand for that site) than a PSE deployed in Newark, N.J. Another such criteria is the available capacity on the suitable edge locations. One way of measuring available capacity is tracking the number of previously launched compute instances per edge location or per edge location server. The hardware virtualization service 606 can track (e.g., in a database) which edge locations have previously been used to launch compute instances and the resource consumption of those compute instances. Another way of measuring available capacity is based on the resource utilization of an edge location or an edge location's servers. An agent or other process executing locally on an edge location or edge location server can monitor utilization of processors, memory, network adapters, and storage devices used to host compute instances and report that utilization data to the hardware virtualization service 606. The hardware virtualization service 606 can select edge locations with the highest amount of capacity (or lowest utilization) from the suitable edge location(s) returned by the edge location placement service 620.

Various approaches to obtaining latency data 609 are possible, including those described below. To facilitate a robust set of customer latency requirements, the edge location placement service 622 can use one or more of the approaches described herein or others to determine latency between, for example, end user electronic devices and base stations, base stations and edge locations, base stations and cloud provider network regions or availability zone data centers, edge locations and edge locations, and edge locations to cloud provider network regions or availability zone data centers. Latency typically refers to either the one-way time between one device sending a message to a recipient and the recipient receiving the message or to the round-trip time between one device issuing a request and subsequently receiving a response to that request. In some embodiments, latency data 609 provides or allows for the derivation of latencies between various points for use in placement determinations by the edge location placement service 622.

Under a first approach, a CSP network can include a latency service. The latency service can periodically receive or otherwise monitor delays throughout the CSP network. The latency service can include an API through which the edge location placement service 622 can issue calls to fetch latency data 609. Such an approach may be referred to as a query-based approach. An exemplary API of the latency service receives one or more routes—e.g., specified via endpoints within the CSP network—and returns the latency for the route(s). Provided an identification of various endpoints in the CSP network (e.g., by IP address), the edge location placement service 622 can build a view of the point-to-point latencies through the CSP network using the latency service of the CSP network. For example, based on knowledge of the various access points (e.g., base stations) to a CSP network, the coverage regions of the access points, and the edge locations, the edge location placement service 622 can build a latency data set relating geographic regions to edge locations. Additionally, based on the knowledge of the various edge locations integrated with the CSP network, the edge location placement service 622 can also measure the latency between the cloud provider network and each of the edge locations. The edge location placement service 622 can store or cache responses from the latency service and other latency measurements in a database of the database service 622, for example.

Under a second approach, a CSP can provide detailed information about the CSP's network topology from which the edge location placement service 622 can derive information to make placement determinations based on a model of distance and hop delays between various points of the network. Such an approach may be referred to as a model-based approach. The network topology information may be provided in or converted to a graph or other suitable data structure that represents things like the number of network hops and distance between network nodes (e.g., between base stations and edge locations, amongst edge locations, and between edge locations and the cloud provider network—the latter possibly augmented by the cloud provider with network topology information related to the connectivity between the CSP network and the cloud provider network). Additionally, the network topology information can include information related to the geographic location of access points for end user devices to the network (e.g., base station coverage). Using a set of heuristics, the network topology information can be used to model the various latencies through the CSP network (e.g., point-to-point latencies) to generate the latency data 609. For example, the heuristics may include an estimated delay for signals between network nodes at a given distance (e.g., using the speed of light), modeled latencies added by various hops through the network (e.g., due to processing delays at routers or other networking equipment), etc. Because the network topology may change over time, the CSP can periodically provide updated network topology information.

Under a third approach, the CSP and/or the cloud provider can set up a network of "publisher" nodes that collect latency data and report it to the edge location placement service 622. Such publisher nodes can collect latency data in a number of ways, such as by pinging other devices, subscribing to events emitted by CSP network components, or polling CSP network APIs periodically to collect QoS data. Though similar to the query-based approach in that it provides a more up to date view of network latency than the model-based approach, the third-approach, referred to as a monitor-based approach, can be implemented with less reliance on the CSP (whether through obtaining access to internal networking APIs such as a latency service, requiring the CSP to deploy latency monitoring facilities that might not exist, or by relying on the CSP for network topology data). For example, edge locations and/or end user electronic devices can include an application that monitors latencies to other devices. At the edge location, the application may be executed by a compute instance or as a control plane component. At the end user electronic device, the application may be a background process incorporated as part of a software development kit used to deploy applications to the end user devices. In either case, the application can periodically fetch an identification of other edge locations, base stations or access points to the CSP network, and/or electronic devices connected to a CSP network (e.g., via IP address) from a service of the cloud provider network or of the CSP network, measure the latency to the identified devices (e.g., via a ping request), and report the results to the edge location placement service 622. In the end user device case, the application can further report latency data between the end user device and its access point into the CSP network (e.g., a base station). The edge location placement service 409 can aggregate and store the reported data as latency data 609.

Figure 7:
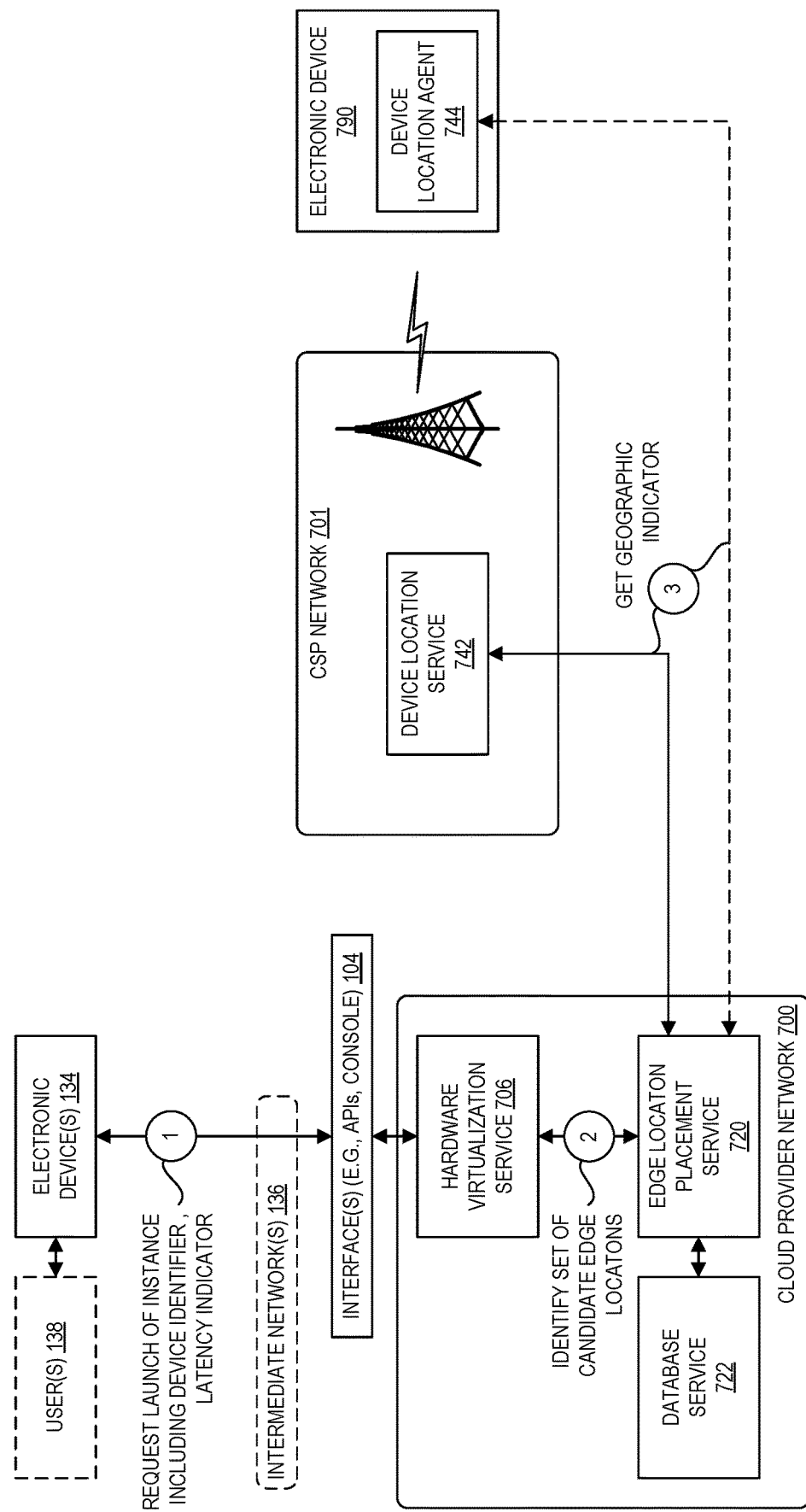
FIG. 7 illustrates another exemplary environment in which compute instances are launched in cloud provider network edge locations according to some embodiments.

FIG. 7 illustrates another exemplary environment in which compute instances are launched in cloud provider network edge locations according to some embodiments. As illustrated, a cloud provider network 700 includes a hardware virtualization service 706, an edge location placement service 720, and a database service 722. Although not illustrated, the cloud provider network 700 has multiple edge locations in CSP networks (e.g., such as described above with reference to FIG. 5).

The numbered circles "1" through "3" of FIG. 7 illustrate an exemplary process through which a user 138 (e.g., a customer of the cloud provider network) can launch a compute instance at one of the edge locations 510. At circle "1" of FIG. 7, the user 138 issues a request to launch a compute instance to the hardware virtualization service 606. Here, the parameters of the request can include a device identifier and an indication of a latency constraint or requirement. The device identifier may take a variety of forms depending on the implementation (e.g., an IMEI number, an IP address, etc.). The latency indicator may be specified in terms of time (e.g., less than 10 milliseconds) between the identified device and the server ultimately selected to host the requested compute instance. The launch request can various other parameters such as described above with reference to FIG. 6.

At circle "2" of FIG. 7, the hardware virtualization service 706 requests an identification of candidate edge locations 510 from the edge location placement service 720 that satisfy the parameters of the user's launch request. The edge location placement service 720 proceeds to identify candidate edge locations 510 such as described above with reference to circle "2" of FIG. 6. To do so, the edge location placement service 720 first obtains a geographic indicator associated with the location of the device using the device identifier. For example, the edge location placement service 720 can request a geographic indicator from a device location service 742 of a CSP network 701 (e.g., by providing the IP address or IMEI number). The device location service 742 can provide the geographic indicator for an identified device. As another example, the edge location placement service 720 can request a geographic indicator from the identified device 790. For example, the device identifier might be an IP address of an electronic device 790 that is executing a device location agent 744. The device location agent 744 can provide a geographic indicator for the electronic device 790. The edge location placement service 720 can use the geographic indicator along with the user-specified latency constraint to identify candidate edge locations as described above for FIG. 6.

Based on the candidate edge locations, if any, returned by the edge location placement service 720, the hardware virtualization service 706 can either return an error to the customer if the request could not be satisfied or proceed with the launch of compute instance(s). The request may fail, for example, if no edge locations satisfy the customer's latency requirements. Assuming the customer's request could be satisfied, the hardware virtualization service 606 can issue control plane command(s) to the edge location(s) to launch the requested instance(s), as indicated at circle "3" of FIG. 7 (e.g., see above description of circle "3" for FIGS. 5 and/or 6).

Note that in some embodiments, the geographic indicator may be inferred based on latency to the electronic device rather than obtaining a specific geographic indicator from the device location service 742 or agent 744. For example, a user 138 can provide a device identifier and a latency requirement. In such a case, the specified device can be used as a proxy for determining a geographic indicator. For example, the hardware virtualization service 706 or the edge location placement service 720 can cause multiple other devices (not shown) to ping the device's IP address from several known locations to infer the device's geographic location and thus a corresponding geographic indicator.

In addition to sending control plane command(s) to a selected edge location to cause the launch of a compute instance, a hardware virtualization service 506, 606, 706 can send control plane command(s) to the selected edge location to associate an IP address on the CSP network with the launched compute instance. The IP address can be selected from the pool of IP addresses in the CSP network address space allocated to the PSE. For example, the launched instance might be given an IP address "A" which a gateway of the PSE advertises to the CSP network components so that when a device connected through the CSP network sends a packet to address "A," the packet is routed to the PSE.

Figure 8:
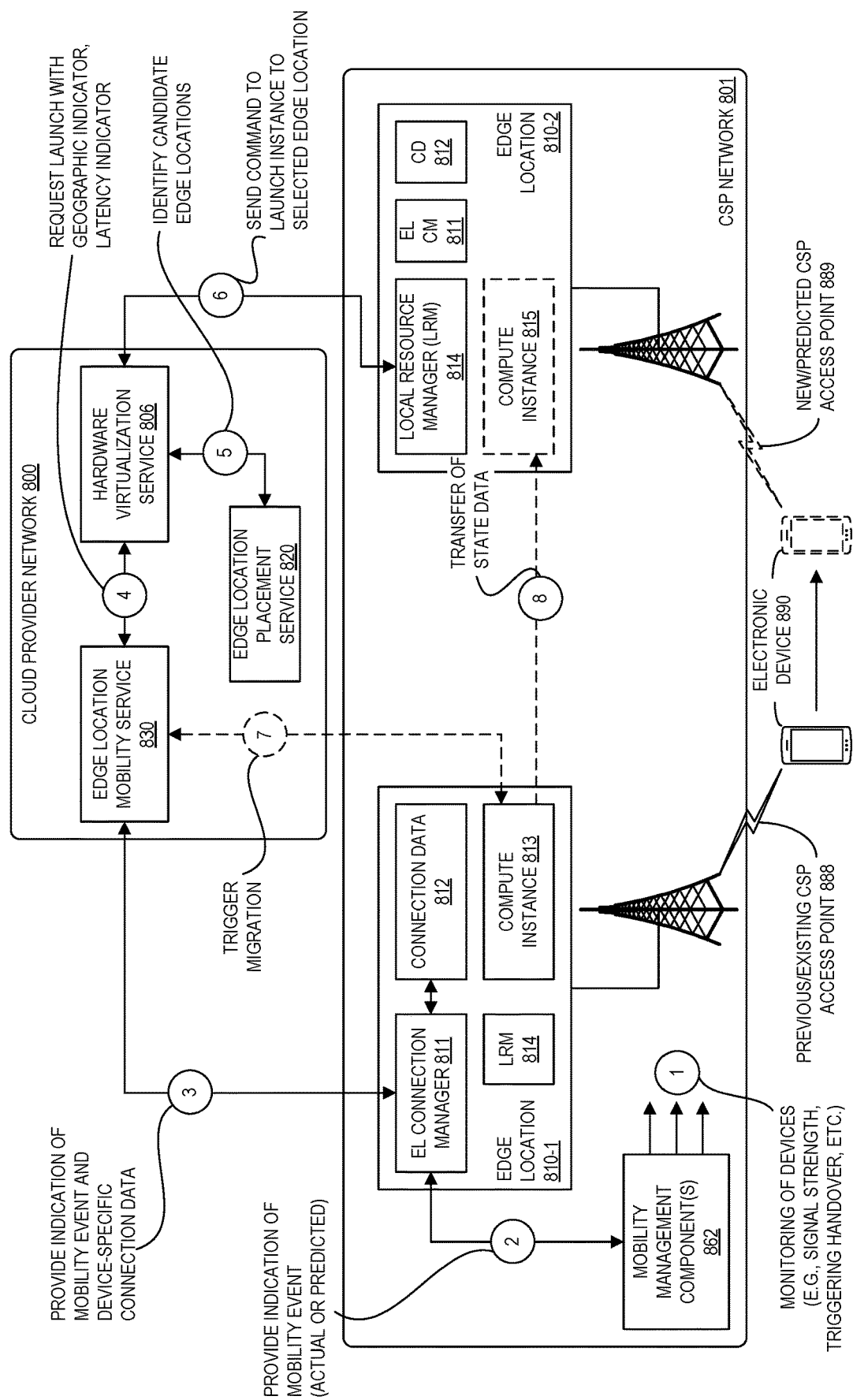
FIG. 8 an exemplary environment in which compute instances are launched due to electronic device mobility according to some embodiments.

FIG. 8 an exemplary environment in which compute instances are launched due to electronic device mobility according to some embodiments. In some scenarios, a cloud provider network can automatically launch compute instances at various edge locations deployed within a communications service provider network to continue to satisfy a customer-specified latency constraint even when the movement of an electronic devices changes the electronic device's access point to the communications service provider network. As mobile devices change their access point to the CSP network, the latency between those access points and a particular edge location deployed within the CSP network can change. As an example and with reference to FIG. 2, an electronic device 212 may have lower latency to a compute instance hosted by an edge location 216 when connected through an access point of RAN 202 than to a compute instance hosted by an edge location 228 when connected when connected through an access point of RAN 202 due to the additional routing of traffic through the aggregation site 206. Conversely, another electronic device connected through an access point of RAN 204 may have higher latency to a compute instance hosted by the edge location 216 as compared to a compute instance hosted by the edge location 228. If a customer of the cloud provider network has provided a latency constraint as part of launching a compute instance within an edge location of a CSP network, the changing access point of devices connected through the CSP network can cause that constraint to be violated. Such scenarios may arise when, for example, a customer of a cloud provider network launched a compute instance to provide low latency connectivity to a specified device and that device later changes access points.

Returning to FIG. 8, control plane components of a cloud provider network 800 manage edge locations 810-1 and 810-2 deployed within a CSP network 801. A compute instance 813 hosted by the edge location 810-1 initially satisfies a customer-specified latency constraint as the electronic device 890 has connected to the CSP network 801 via an access point 888. At some point, the electronic device 890 changes its access point to the CSP network 801 from the access point 888 to an access point 889, and the numbered circles "1" through "8" of FIG. 8 track an exemplary process through which a compute instance 815 is launched to account for movement of the electronic device 890.

At circle "1" of FIG. 8, a mobility management component 862 of the CSP network 801 manages the mobility of devices connected to the CSP network 801, including the electronic device 890, as those devices move and possibly change access points to the CSP network 801. Such a change in access points is referred to herein as a "mobility event." The mobility management component is typically a defined component in wireless networks, such as the Access and Mobility Management Function (AMF) for 5G networks or the Mobility Management Entity (MME) for 4G or LTE networks. The detection of such mobility events in a CSP network 801, for example, may be based on a certain signal measured by the electronic device 890 that is periodically reported to the CSP network 801 or when other conditions are satisfied. These measurements, for example, can include the received power or the signal quality perceived by the electronic device 890 coming from different geographic areas of coverage (or "cells") provided by various access points (e.g., access points 888, 889). In some embodiments, these measurements can be used by mobility management component(s) 862 and/or other components of the CSP network 801 to decide whether a handover of the electronic device 890 from one access point to another is to take place, and which access point is the best connection point.

In this example, the electronic device 890 is moving such that its connection to the CSP network 801 is or will be better via access point 889 than access point 888. At circle "2" of FIG. 8, the mobility management component 862 of the CSP network 801 provides an indication of a mobility event involving the electronic device 890 to an edge location connection manager 811. As indicated above, the mobility management component(s) 862 may make such a determination based on measurements received from electronic device 890 or based on signal quality data otherwise obtained by the component. In some embodiments, the indication of the mobility event is an indication that the electronic device is actually moving from a first cell provided by a first access point 888 to a second cell provided by a second access point 889. In some embodiments, the indication of the mobility event includes one or more predictions that the electronic device 890 will move from the cell provided by the first access point 888 to one or more other cells provided by other access points of the CSP network 801. Such predictive mobility events can include a likelihood that the electronic device 890 will change its access point to the one or more other cells and may include an indication of when the event will actually occur.

In some embodiments, the mobility management component(s) 862 sends mobility events to all or some portion of the total number of edge locations deployed to the CSP network 801. In other embodiments, the edge location connection manager 811 of each edge location tracks the electronic devices that have connected to a compute instance hosted by that edge location and requests that the mobility management component(s) 862 send updates pertaining to those electronic device(s).

At circle "3" of FIG. 8, the edge location connection manager 811 sends an indication of the mobility event and device-specific connection data to an edge location mobility service 830 of the cloud provider network 800. In some embodiments, the edge location connection manager 811 obtains some or all the device-specific connection data from connection data 812 maintained by the edge location 810-1. The connection data 812 can include source and destination network addresses associated with connections between electronic devices (e.g., electronic device 890) and compute instances (e.g., compute instance 813), a time connections were established, a status of the connections, a type of protocol used, etc. In some embodiments, the edge location connection manager 811 checks connection data 812 to determine whether the electronic device associated with a received mobility event is connected to one or more of the compute instances hosted by the edge location 810-1 before sending an indication of the mobility event and device-specific connection data for that electronic device to the edge location mobility service 830.

In some embodiments, the edge location mobility service 830 determines that a communications delay between the electronic device 890 and a first compute instance 813 via the second access point 889 would not satisfy a latency constraint (and thus a migration of the compute instance is to occur so that the latency constrain is satisfied). The constraint may be unsatisfied due to additional hops or distance introduced by routing communications from the second access point 889 to the existing compute instance 813 or because the edge location 810-1 is unreachable from the second access point 889 (e.g., due to the network topology and configuration of the CSP network 801). The edge location mobility service 830 can obtain the latency constraint associated with an instance from data stored during the request to launch the instance (e.g., stored in a database, such as part of an application profile, when the customer requests the launch of an instance such as described above with reference to FIGS. 5, 6, and 7). The edge location mobility service 830 can obtain the delay between the existing compute instance and the new access point can be determined from latency data (e.g., latency data 609).

Although not illustrated, in some embodiments the edge location connection manager for a given edge location can send connection data to the edge location mobility service, and the mobility management component(s) of the CSP network 801 can send mobility events to the edge location mobility service.

Assuming the new delay between the compute instance 813 and the access point 889 exceeds the latency constraint, the edge location mobility service 830 sends an instance launch request to a hardware virtualization service 806 of the cloud provider network 800, as indicated at circle "4" of FIG. 8. As indicated above, the geographic indicator may take a variety of forms depending on the implementation (e.g., a geocoordinate, a zip code, a metropolitan area, etc.). In some embodiments, the geographic indicator is based on the indication of the mobility event provided to the edge location mobility service 830, for example, such that the geographic indicator corresponds to a location of an access point to which the electronic device 890 is moving or is predicted to move. In some embodiments, additional launch parameters can include an identifier of a particular CSP or a particular network of a CSP, parameters identifying hardware requirements for the edge location, etc., such that the migration of the compute instance is performed to an edge location having similar characteristics as the edge location 810-1).

At circle "5" of FIG. 8, the hardware virtualization service 806 requests an identification of candidate edge locations from the edge location placement service 820 that satisfy the parameters of the launch request received from the edge location mobility service 830. The edge location placement service 820 can evaluate parameters against latency data available to the edge location placement service 820. Typically, the latency data provides an indication of latencies between points within a CSP network 801 (e.g., base stations providing connectivity within a region and edge locations)

and possibly between points within a CSP network 801 and points in the cloud provider network 800 (e.g., compute instances hosted by servers in a cloud provider network data center). The latency data can further include geographic data about the locations of various access points to the CSP network 801 to allow the edge location placement service 820 to correlate the specified geographic indicator to CSP network(s) (e.g., coverage areas of base stations or other equipment through which electronic devices access the CSP network 801).

Upon receipt of a request for suitable edge locations that satisfy various parameters specified in the request from the hardware virtualization service 806, the edge location placement service 820 can access the latency data and other information to identify which edge locations satisfy those requirements. Based on the candidate edge locations, if any, returned by the edge location placement service 820, the hardware virtualization service 806 can select one of the candidates such as through the evaluation of a cost function for the candidates as described herein. Note that as indicated above, the mobility event might include a probability of the electronic device 890 moving from access point 889 to 890 (although the switch has yet to occur). In such a case, the hardware virtualization service 806 can factor that likelihood into the cost function to determine whether to launch an instance. For example, the hardware virtualization service 806 may opt to wait for an actual mobility event if the likelihood of movement is low (e.g., <50%) and the resource utilization of the candidate edge locations is high (e.g., enough unused resource capacity for ten new instances out of a total capacity for 100 instances).

In some embodiments, an identifier of the new access point 889 can be used a proxy for the geographic indicator. The edge location mobility service 830 can receive the identifier from the mobility management component(s) 862 (possibly via the edge location connection manager 811) and send that identifier to the hardware virtualization service 806. The hardware virtualization service 806 can send that identifier to the edge location placement service 820 which in turn can use the access point identifier to estimate the latency to candidate edge locations.

In this example, the edge location placement service 820 returns an identification of edge location 810-2 as a candidate edge location and the hardware virtualization service 806 selects edge location 810-2 if more than one candidate was returned. The hardware virtualization service 806 issue control plane command(s) to a local resource manager 814 at the edge location 810-2 to launch the requested instance, as indicated at circle "6" of FIG. 8. In some embodiments, a compute instance 815 launched at an edge location 810-2 responsive to a mobility event associated with an electronic device 890 can be based on a same resource (e.g., a virtual machine image, container image, etc.) as that used to launch the compute instance 813 to which the electronic device 890 was previously connected. Once launched, the electronic device 890 can establish a connection with the compute instance 815 launched at the edge location 810-2 and resume use of any application(s) with which the device was interacting.

In some embodiments, a pool of IP addresses in the CSP network address space is reserved for one or more edge locations by the CSP network. Compute instances launched on those edge locations are assigned an IP address from the pool. In this manner, a compute instance hosted by an edge location can be perceived as another device on the CSP network, facilitating the routing of traffic between electronic device that obtained connectivity through the CSP network (e.g., the electronic device 890) and compute instances hosted by edge locations. In some embodiments, a control plane component such as the hardware virtualization service 806 assigns the new compute instance 815 a new IP address from the pool.

The hardware virtualization service 806 can return an identifier of the new compute instance 815 to the edge location mobility service 830. In some embodiments, the edge location mobility service 830 can check the connection data associated with the original compute instance 813 to determine whether to leave compute instance 813 running or to migrate it to compute instance 815. For example, if the compute instance 813 is still communicating with other electronic devices, compute instance 813 can continue to support those other devices while the electronic device 890 begins communicating with the compute instance 815. In some embodiments, the edge location mobility service 830 can trigger a "migration" with compute instance 815 as the target and the compute instance 813 as the source as indicated at circle "7" of FIG. 8. Migration generally refers to moving virtual machine instances (and/or other resources) between hosts. There are different types of migration including live migration and reboot migration. During a reboot migration, the customer experiences an outage and an effective power cycle of their virtual machine instance. For example, a control plane service can coordinate a reboot migration workflow that involves tearing down the current compute instance on the original host and subsequently creating a new compute instance on the new host. The instance is rebooted by being shut down on the original host and booted up again on the new host.

Live migration refers to the process of moving a running virtual machine or application between different physical machines without significantly disrupting the availability of the virtual machine (e.g., the down time of the virtual machine is not noticeable by the end user). When the control plane executes a live migration workflow it can create a new "inactive" compute instance on the new host while the original compute instance on the original host continues to run. State data, such as memory (including any in-memory state of running applications), storage, and/or network connectivity of the virtual machine are transferred from the original host with the active compute instance to the new host with the inactive compute instance. The control plane can transition the inactive compute instance to become the active compute instance and demote the original active compute instance to become the inactive compute instance, after which the inactive compute instance can be discarded.

As indicated at circle "8" of FIG. 8, state data migrated from the compute instance 813 to the compute instance 815 can be sent directly through the CSP network 801. In other embodiments, the state data may traverse a portion of the cloud provider network 800 (e.g., if one edge location cannot communicate with the other edge location through the CSP network 801).

Note that the edge location 810-1 includes a local resource manager 814, and the edge location 810-2 includes an edge location connection manager 811 and connection data 812. While the discussion of FIG. 8 contemplated the electronic device 890 moving "nearer" edge location 810-2, the reverse could be true, or the electronic device 890 might later move to yet another access point (not shown) that fails to satisfy the latency constraint in communications to edge location 810-2. Accordingly, the description of the operations of edge location 810-1 could apply to edge location 810-2 and vice versa.

Figure 9:
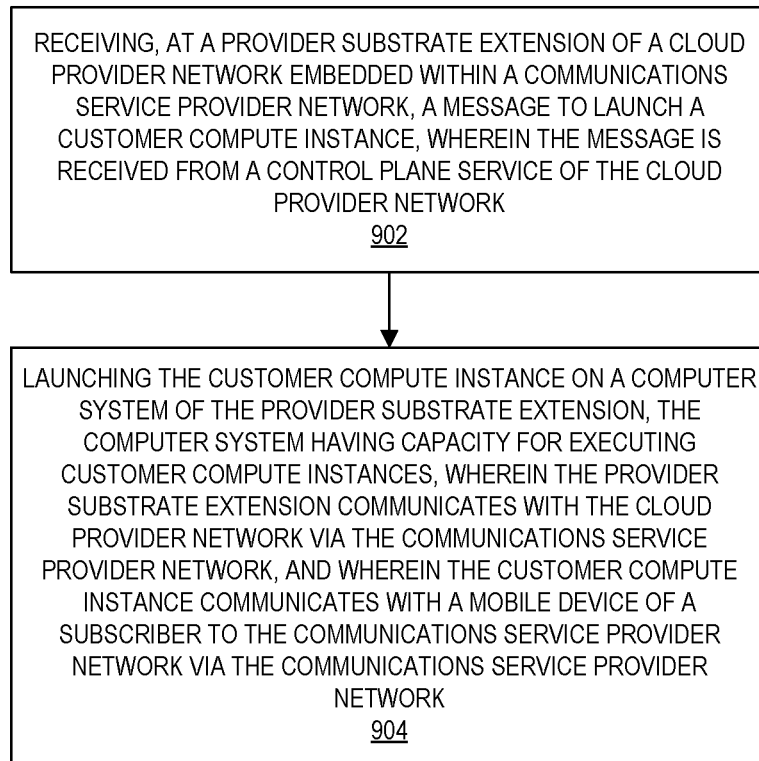
FIG. 9 is a flow diagram illustrating operations of a method for launching compute instances in cloud provider network edge locations according to some embodiments.

FIG. 9 is a flow diagram illustrating operations of a method for launching compute instances in cloud provider network edge locations according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by one or more local control components of a provider substrate extension deployed within a communications service provider network (e.g., a local resource manager or other component that manages the launch, configuration, and termination of compute instances such as virtual machines or containers) of the other figures.

The operations include, at block 902, receiving, at a provider substrate extension of a cloud provider network embedded within a communications service provider network, a message to launch a customer compute instance, wherein the message is received from a control plane service of the cloud provider network. The operations include, at block 904, launching the customer compute instance on a computer system of the provider substrate extension, the computer system having capacity for executing customer compute instances, wherein the provider substrate extension communicates with the cloud provider network via the communications service provider network, and wherein the customer compute instance communicates with a mobile device of a subscriber to the communications service provider network via the communications service provider network.

As illustrated in FIG. 2, cloud provider network substrate extensions (PSEs) can be deployed within communications service provider (CSP) networks. Those CSP networks often provide devices of subscribers with data connectivity to the CSP network and to other networks such as the internet. PSEs can include computing resources (e.g., processors, memory, etc.) on which customers of the cloud provider network can launch compute instances such as virtual machines or containers. A local management component of the PSE such as a container engine or virtual machine manager can manage the compute instances hosted using the PSE resources. A control plane component of the cloud provider network such as a hardware virtualization service can issue commands to the local management component to launch instances. The commands may be routed via a secure tunnel between the cloud provider network and the PSE through the CSP network.

The deployment or integration of PSEs within a CSP network can reduce the latency that might otherwise exist were a compute instance to be hosted further away from the CSP network (e.g., in a regional data center of the cloud provider network). For example, communications between a compute instance hosted by a PSE deployed within a CSP network and a mobile device can be routed entirely within the CSP network without requiring the traffic to leave the CSP network (e.g., to be routed via an internet exchange).

Figure 10:
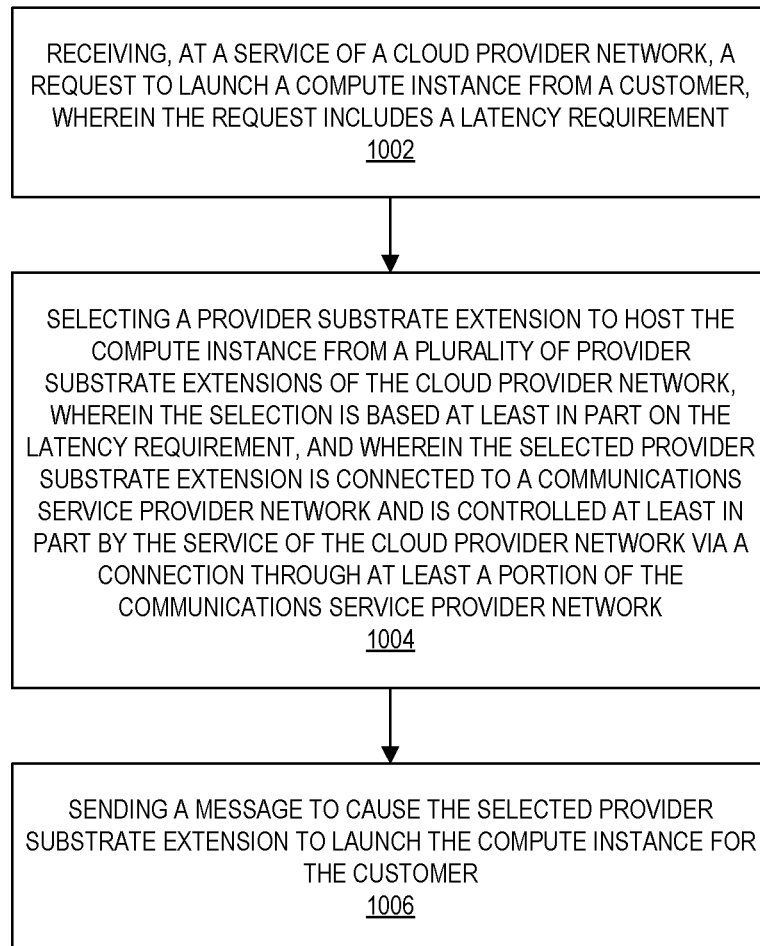
FIG. 10 is a flow diagram illustrating operations of another method for launching compute instances in cloud provider network edge locations according to some embodiments.

FIG. 10 is a flow diagram illustrating operations of another method for launching compute instances in cloud provider network edge locations according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by one or more control plane services of a cloud provider network (e.g., the hardware virtualization services 606, 706, the edge location placement services 620, 720) of the other figures.

The operations include, at block 1002, receiving, at a service of a cloud provider network, a request to launch a compute instance from a customer, wherein the request includes a latency requirement. As explained above, one of the advantages of deploying or embedding provider substrate extensions or edge locations within communications service provider networks is reduced latency between end-user devices and customer compute instances. To provide customers of the cloud provider network with the ability to exploit the reduced latency, allowing a customer to specify a latency requirement or constraint that governs where the customer's compute instance is ultimately launched is beneficial. Accordingly, a cloud provider network can include an interface such as an API through which customers can request the launch of instances given a latency requirement, such as described above with reference to FIGS. 6 and 7.

The operations include, at block 1004, selecting a provider substrate extension to host the compute instance from a plurality of provider substrate extensions of the cloud provider network, wherein the selection is based at least in part on the latency requirement, and wherein the selected provider substrate extension is connected to a communications service provider network and is controlled at least in part by the service of the cloud provider network via a connection through at least a portion of the communications service provider network. As explained with reference to FIGS. 6 and 7, an edge location placement service 620, 720 can evaluate candidate edge locations to determine which edge locations satisfy the customers latency requirement. To do so, the edge location placement service obtains a geographic indicator that can be correlated to a geographic region covered by one or more access point(s) in the CSP network and evaluates the latency from that point or points to edge locations deployed within the CSP network. Such a geographic indicator might be provided with the request received at block 1002 (e.g., by a customer specifying a geographic region such as a city, a zip code, etc.) or obtained by determining the location of a device identified with the request, for example. Various techniques can be used to obtain latency values or estimated values between points of the CSP network (e.g., edge location to access point). The edge location placement service can determine which, if any, edge locations satisfy the customer's latency requirement and return that candidate set to the hardware virtualization service. The set can include an indication of the latency margin between each of the edge locations in the set relative to the latency requirement. Using a cost function or other technique to rank the candidate edge locations, the hardware virtualization service can select an edge location on which to host the requested compute instance. Factors that may be used in the selection include the available hardware capacity at the candidate edge locations, the overall utilization of the capacity, the cost of the capacity, the margin of the latency relative to the customer's latency requirement, etc.

The operations include, at block 1006, sending a message to cause the selected provider substrate extension to launch the compute instance for the customer. Based on the selected provider substrate extension, the hardware virtualization service can issue one or more commands to the provider substrate extension to launch the requested instance (e.g., via a tunnel between the cloud provider network and the provider substrate extension deployed within the CSP network).

Figure 11:
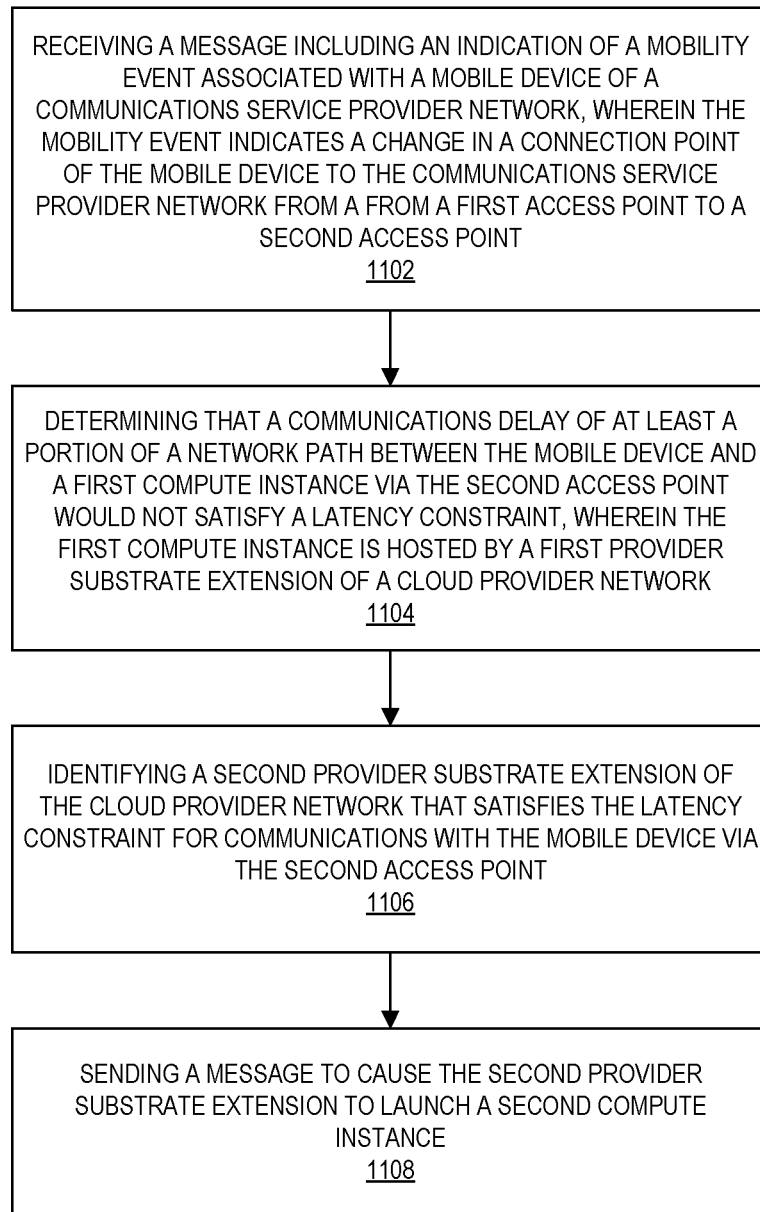
FIG. 11 is a flow diagram illustrating operations of a method for launching compute instances due to electronic device mobility according to some embodiments.

FIG. 11 is a flow diagram illustrating operations of a method for launching compute instances due to electronic device mobility according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by one or more control plane services of a cloud provider network (e.g., the edge location mobility service 830, the hardware virtualization service 806, the edge location placement service 820) of the other figures.

The operations include, at block 1102, receiving a message including an indication of a mobility event associated with a mobile device of a communications service provider network, wherein the mobility event indicates a change in a connection point of the mobile device to the communications service provider network from a from a first access point to a second access point. As explained with reference to FIG. 8, the initial placement determination for a compute instance based on a latency requirement may no longer satisfy that latency requirement as devices move amongst different access points of a CSP network. To continue to meet a latency requirement, the cloud provider network can respond to mobility events output by a mobility management component of the CSP network such as an Access and Mobility and Mobility Management Function (AMF) for 5G networks or the Mobility Management Entity (MME) for 4G or LTE networks. Such mobility events may be actual events (e.g., a mobile device has changed its connection point from a first access point to a second access point) or predicted events (e.g., the mobile device is likely to connect to the second access point).

The operations include, at block 1104, determining that a communications delay of at least a portion of a network path between the mobile device and a first compute instance via the second access point would not satisfy a latency constraint, wherein the first compute instance is hosted by a first provider substrate extension of a cloud provider network. As described with reference to FIG. 8, not all mobility events may cause a latency requirement to be violated. For example, one provider substrate extension hosting a compute instance might meet the latency requirement to a group of access points of the CSP network, so a mobile device switching amongst those access points would not result in a violation of a latency requirement. The edge location mobility service 830 can defer launching new instances until the latency requirement is (or is predicted to be) violated. For example, the edge location mobility service 830 can evaluate the latency data (e.g., latency data 609) between the first access point and a compute instance hosted by a first provider substrate extension and between the second access point and the compute instance hosted by a first provider substrate extension.

The operations include, at block 1106, identifying a second provider substrate extension of the cloud provider network that satisfies the latency constraint for communications with the mobile device via the second access point. As described with reference to FIG. 8, placement techniques such as those described with reference to FIGS. 6 and 7 can be used to identify another suitable provider substrate extension that meets the latency requirement given the mobile device's connectivity through the second access point. For example, the edge location mobility service 830 can request the launch of a new instance given the latency requirement and an indication of the new (second) access point (e.g., whether based on a geographic identifier or an access point identifier that identifies the access point within the CSP network). The hardware virtualization service 806 and the edge location placement service 820 can operate to identify candidate provider substrate extensions and select a provider substrate extension from those candidates on which to launch a compute instance.

The operations include, at block 1108, sending a message to cause the second provider substrate extension to launch a second compute instance. Based on the selected provider substrate extension, the hardware virtualization service can issue one or more commands to the provider substrate extension to launch the requested instance (e.g., via a tunnel between the cloud provider network and the provider substrate extension deployed within the CSP network).

Figure 12:
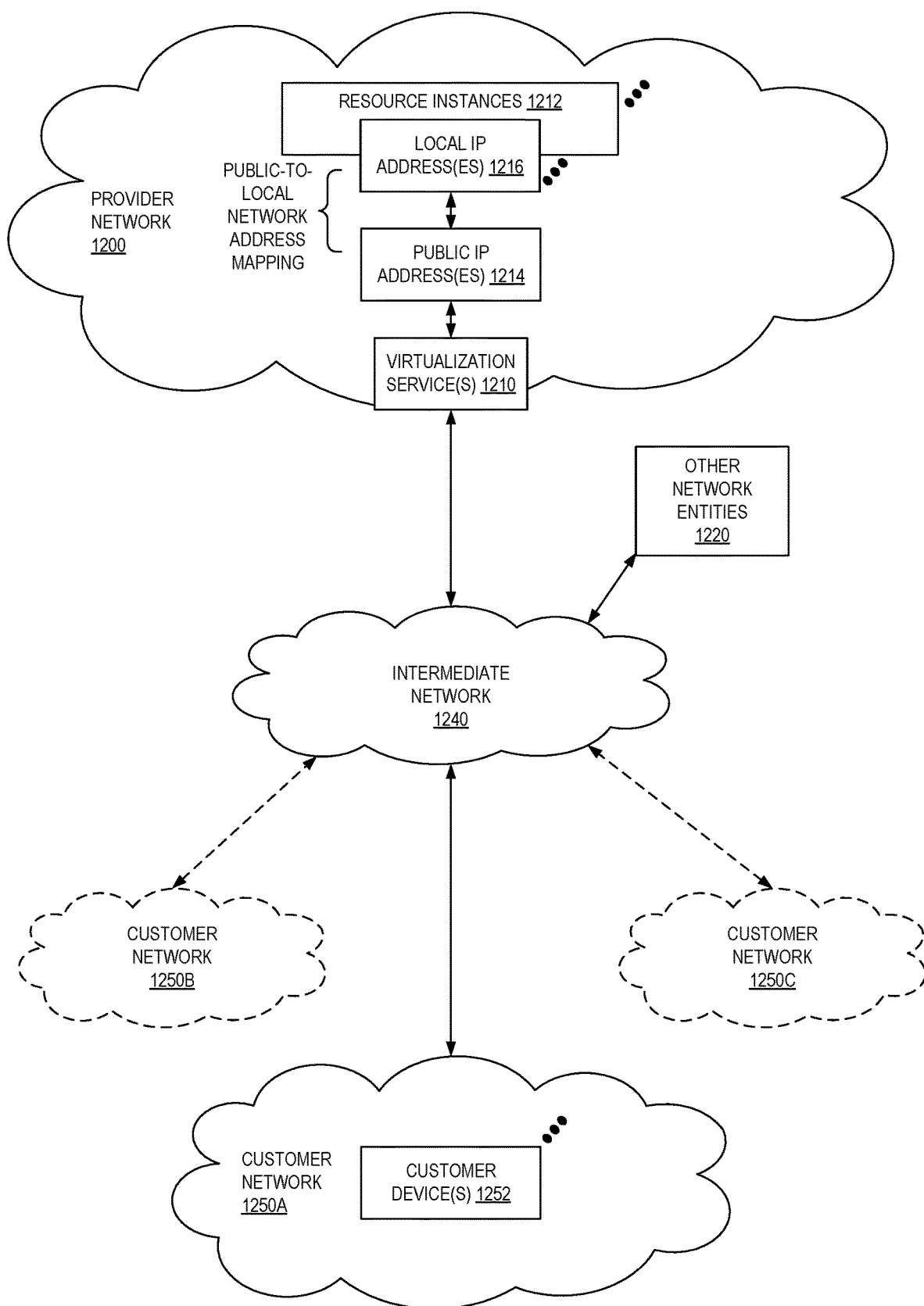
FIG. 12 illustrates an example provider network environment according to some embodiments.

FIG. 12 illustrates an example provider network (or "service provider system") environment according to some embodiments. A provider network 1200 may provide resource virtualization to customers via one or more virtualization services 1210 that allow customers to purchase, rent, or otherwise obtain instances 1212 of virtualized resources, including but not limited to computation and storage resources, implemented on devices within the provider network or networks in one or more data centers. Local Internet Protocol (IP) addresses 1216 may be associated with the resource instances 1212; the local IP addresses are the internal network addresses of the resource instances 1212 on the provider network 1200. In some embodiments, the provider network 1200 may also provide public IP addresses 1214 and/or public IP address ranges (e.g., Internet Protocol version 4 (IPv4) or Internet Protocol version 6 (IPv6) addresses) that customers may obtain from the provider 1200.

Conventionally, the provider network 1200, via the virtualization services 1210, may allow a customer of the service provider (e.g., a customer that operates one or more client networks 1250A-1250C including one or more customer device(s) 1252) to dynamically associate at least some public IP addresses 1214 assigned or allocated to the customer with particular resource instances 1212 assigned to the customer. The provider network 1200 may also allow the customer to remap a public IP address 1214, previously mapped to one virtualized computing resource instance 1212 allocated to the customer, to another virtualized computing resource instance 1212 that is also allocated to the customer. Using the virtualized computing resource instances 1212 and public IP addresses 1214 provided by the service provider, a customer of the service provider such as the operator of customer network(s) 1250A-1250C may, for example, implement customer-specific applications and present the customer's applications on an intermediate network 1240, such as the Internet. Other network entities 1220 on the intermediate network 1240 may then generate traffic to a destination public IP address 1214 published by the customer network(s) 1250A-1250C; the traffic is routed to the service provider data center, and at the data center is routed, via a network substrate, to the local IP address 1216 of the virtualized computing resource instance 1212 currently mapped to the destination public IP address 1214. Similarly, response traffic from the virtualized computing resource instance 1212 may be routed via the network substrate back onto the intermediate network 1240 to the source entity 1220.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1200; a customer may then assign their allocated public IP addresses to particular resource instances allocated to the customer. These public IP addresses may be referred to as customer public IP addresses, or simply customer IP addresses. Instead of being assigned by the provider network 1200 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 13:
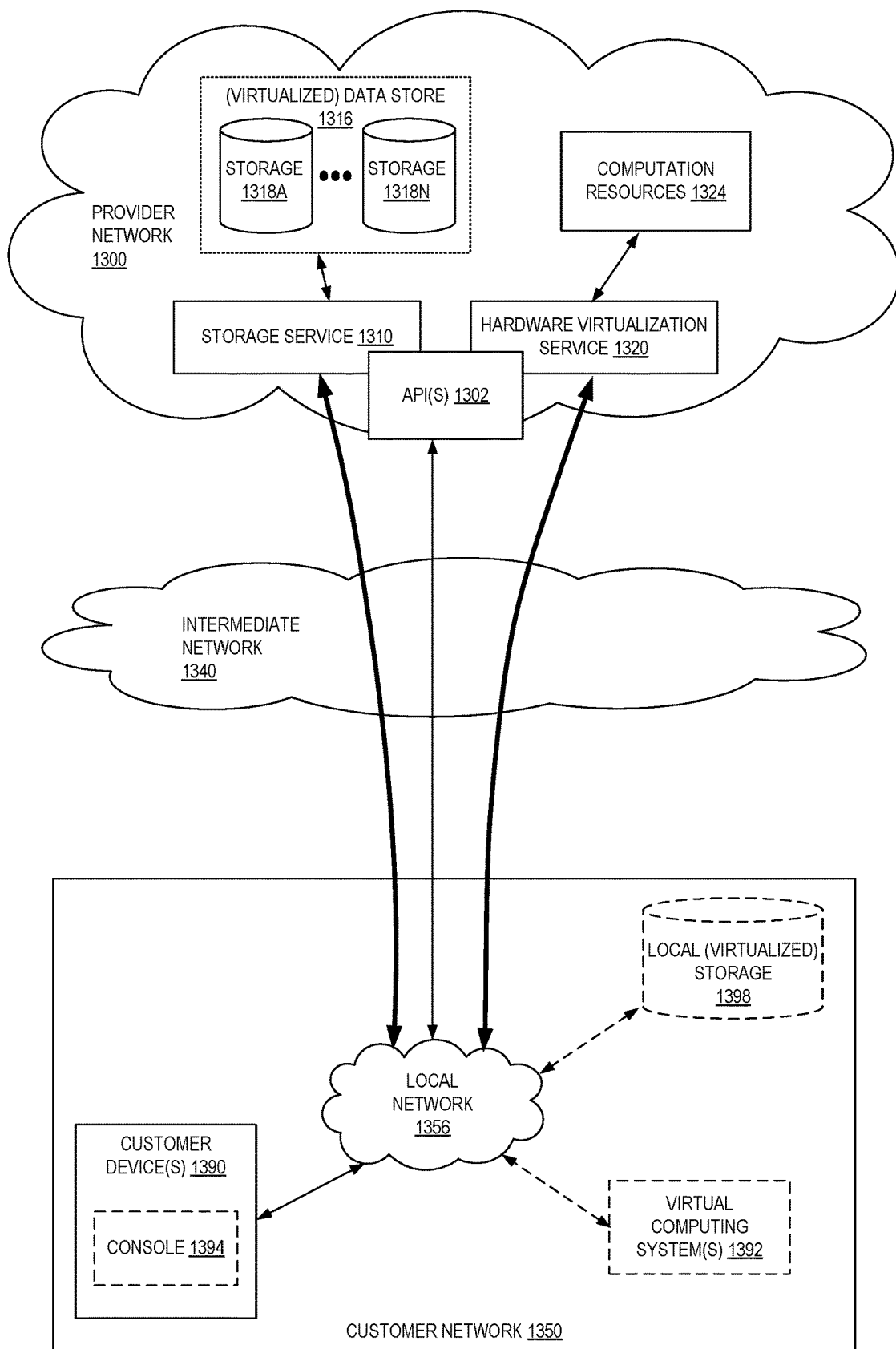
FIG. 13 is a block diagram of an example provider network that provides a storage service and a hardware virtualization service to customers according to some embodiments.

FIG. 13 is a block diagram of an example provider network that provides a storage service and a hardware virtualization service to customers, according to some embodiments. Hardware virtualization service 1320 provides multiple computation resources 1324 (e.g., VMs) to customers. The computation resources 1324 may, for example, be rented or leased to customers of the provider network 1300 (e.g., to a customer that implements customer network 1350). Each computation resource 1324 may be provided with one or more local IP addresses. Provider network 1300 may be configured to route packets from the local IP addresses of the computation resources 1324 to public Internet destinations, and from public Internet sources to the local IP addresses of computation resources 1324.

Provider network 1300 may provide a customer network 1350, for example coupled to intermediate network 1340 via local network 1356, the ability to implement virtual computing systems 1392 via hardware virtualization service 1320 coupled to intermediate network 1340 and to provider network 1300. In some embodiments, hardware virtualization service 1320 may provide one or more APIs 1302, for example a web services interface, via which a customer network 1350 may access functionality provided by the hardware virtualization service 1320, for example via a console 1394 (e.g., a web-based application, standalone application, mobile application, etc.). In some embodiments, at the provider network 1300, each virtual computing system 1392 at customer network 1350 may correspond to a computation resource 1324 that is leased, rented, or otherwise provided to customer network 1350.

From an instance of a virtual computing system 1392 and/or another customer device 1390 (e.g., via console 1394), the customer may access the functionality of storage service 1310, for example via one or more APIs 1302, to access data from and store data to storage resources 1318A-1318N of a virtual data store 1316 (e.g., a folder or "bucket", a virtualized volume, a database, etc.) provided by the provider network 1300. In some embodiments, a virtualized data store gateway (not shown) may be provided at the customer network 1350 that may locally cache at least some data, for example frequently-accessed or critical data, and that may communicate with storage service 1310 via one or more communications channels to upload new or modified data from a local cache so that the primary store of data (virtualized data store 1316) is maintained. In some embodiments, a user, via a virtual computing system 1392 and/or on another customer device 1390, may mount and access virtual data store 1316 volumes via storage service 1310 acting as a storage virtualization service, and these volumes may appear to the user as local (virtualized) storage 1398.

While not shown in FIG. 13, the virtualization service(s) may also be accessed from resource instances within the provider network 1300 via API(s) 1302. For example, a customer, appliance service provider, or other entity may access a virtualization service from within a respective virtual network on the provider network 1300 via an API 1302 to request allocation of one or more resource instances within the virtual network or within another virtual network.

Figure 14:
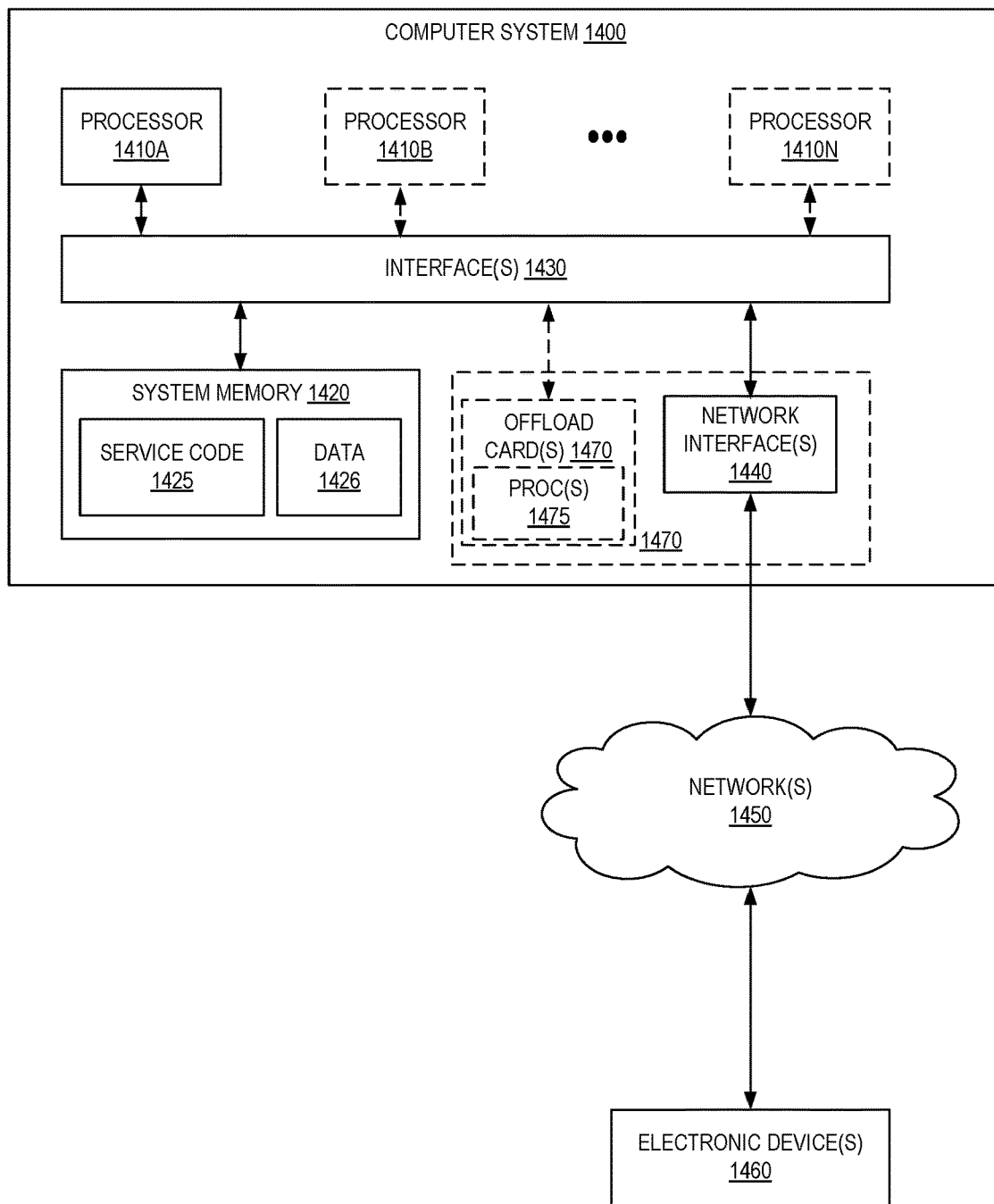
FIG. 14 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1400 illustrated in FIG. 14. In the illustrated embodiment, computer system 1400 includes one or more processors 1410 coupled to a system memory 1420 via an input/output (I/O) interface 1430. Computer system 1400 further includes a network interface 1440 coupled to I/O interface 1430. While FIG. 14 shows computer system 1400 as a single computing device, in various embodiments a computer system 1400 may include one computing device or any number of computing devices configured to work together as a single computer system 1400.

In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1410 may commonly, but not necessarily, implement the same ISA.

System memory 1420 may store instructions and data accessible by processor(s) 1410. In various embodiments, system memory 1420 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1420 as service code 1425 and data 1426. For example, service code 1425 can include code to implement a hardware virtualization service (e.g., 506, 606, 706, 806), an edge location placement service (e.g., 620, 720, 820), an edge location mobility service (e.g., 832), or other services or components illustrated in the other figures. Data 1426 can include data such as the latency data 609, application profiles, geographic data related to points within CSP networks, edge location data 509, etc.

In one embodiment, I/O interface 1430 may be configured to coordinate I/O traffic between processor 1410, system memory 1420, and any peripheral devices in the device, including network interface 1440 or other peripheral interfaces. In some embodiments, I/O interface 1430 may perform any necessary protocol, timing, or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices 1460 attached to a network or networks 1450, such as other computer systems or devices as illustrated in FIG. 1, for example. In various embodiments, network interface 1440 may support communication via any suitable wired or wireless general data networks, such as types of Ethernet network, for example. Additionally, network interface 1440 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1400 includes one or more offload cards 1470 (including one or more processors 1475, and possibly including the one or more network interfaces 1440) that are connected using an I/O interface 1430 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1400 may act as a host electronic device (e.g., operating as part of a hardware virtualization service) that hosts compute instances, and the one or more offload cards 1470 execute a virtualization manager that can manage compute instances that execute on the host electronic device. As an example, in some embodiments the offload card(s) 1470 can perform compute instance management operations such as pausing and/or un-pausing compute instances, launching and/or terminating compute instances, performing memory transfer/copying operations, etc. These management operations may, in some embodiments, be performed by the offload card(s) 1470 in coordination with a hypervisor (e.g., upon a request from a hypervisor) that is executed by the other processors 1410A-1410N of the computer system 1400. However, in some embodiments the virtualization manager implemented by the offload card(s) 1470 can accommodate requests from other entities (e.g., from compute instances themselves), and may not coordinate with (or service) any separate hypervisor.

In some embodiments, system memory 1420 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1400 via I/O interface 1430. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1400 as system memory 1420 or another type of memory. Further, a computer-accessible medium may include transmission media or signals such as electrical, electromagnetic, or digital signals, conveyed via a communication medium such as a network and/or a wireless link, such as may be implemented via network interface 1440.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1318A-1318N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A system comprising:
a cloud provider network including a plurality of regions, each region of the plurality of regions including a control plane and a data plane, the control plane including a hardware virtualization service to manage customer compute instances hosted on resources of the region of the cloud provider network; and
a plurality of edge locations embedded in one or more communications service provider networks, where a first edge location of the plurality of edge locations:
is controlled at least in part by a control plane of a first region of the plurality of regions via a network connection through a first communications service provider network in which the first edge location is embedded,
includes capacity for hosting customer compute instances, and
uses the first communications service provider network to communicate with a mobile device of a subscriber to the first communications service provider network.

2. The system of claim 1, wherein traffic between the first edge location and the mobile device does not traverse a network that carries traffic of users not subscribed to the first communications service provider network.

3. The system of claim 1, further comprising a second edge location of the plurality of edge locations, wherein the second edge location:
is controlled at least in part by a control plane of a second region of the plurality of regions,
includes capacity for hosting customer compute instances, and
uses a second communications service provider network to communicate with a second mobile device of a second subscriber to the second communications service provider network.

4. A system comprising:
a cloud provider network including a first control plane service to manage customer compute instances hosted on resources of the cloud provider network; and
a first provider substrate extension of the cloud provider network connected to a first communications service provider network, wherein the first provider substrate extension:
includes a first computer system having capacity for executing customer compute instances;
is controlled at least in part by the first control plane service via a connection through at least a portion of the first communications service provider network, and
executes at least a first customer compute instance using the first computer system, wherein the first customer compute instance communicates with a first mobile computer system connected via the first communications service provider network.

5. The system of claim 4, wherein the first communications service provider network provides connectivity to devices of subscribers to the first communications service provider network.

6. The system of claim 5, wherein the first customer compute instance communicates with the first mobile computer system without traversing a network that carries traffic of users not subscribed to the first communications service provider network.

7. The system of claim 4, wherein the connection through at least a portion of the first communications service provider network is a secure tunnel.

8. The system of claim 4, wherein the first provider substrate extension is connected to at least one of a network component of a radio access network of the first communications service provider network, a network component of an aggregation site of the first communications service provider network, or a network component of a core network of the first communications service provider network.

9. The system of claim 4, further comprising a plurality of provider substrate extensions of the cloud provider network deployed within the first communications service provider network at different geographic locations, wherein the plurality of provider substrate extensions includes the first provider substrate extension.

10. The system of claim 9,
wherein the first control plane service is of a first region of the cloud provider network and is to manage customer compute instances hosted on resources of the first region of the cloud provider network,
wherein the cloud provider network includes a second region, the second region including a second control plane service to manage customer compute instances hosted on resources of the second region of the cloud provider network, and further comprising
a second provider substrate extension connected to a second communications service provider network, wherein the second provider substrate extension:
includes a second computer system having capacity for executing customer compute instances,
is controlled at least in part by the second control plane service via a connection through at least a portion of the second communications service provider network, and
executes at least a second customer compute instance using the second computer system, wherein the second customer compute instance communicates with a second mobile computer system connected via the second communications service provider network.

11. The system of claim 10, wherein the second control plane service controls the second provider substrate extension based at least in part on one or more of the second region being in the same country as the second communications service provider network, the second region including control plane services that support usage of a component of the second computer system not present in the first computer system, or a latency between the second provider substrate extension and the second region.

12. The system of claim 9, further comprising:
a second provider substrate extension of the plurality of provider substrate extensions, the second provider substrate extension connected to a second communications service provider network, wherein the second provider substrate extension:
  includes a second computer system having capacity for executing customer compute instances;
  is controlled at least in part by the first control plane service via a connection through at least a portion of the second communications service provider network, and
  executes at least a second customer compute instance using the second computer system, wherein the second customer compute instance communicates with a second mobile computer system connected via the second communications service provider network; and
wherein the first communications service provider network is a fourth-generation mobile telecommunications network of a communications service provider and the second communications service provider network is a fifth-generation mobile telecommunications network of the communications service provider.

13. A computer-implemented method comprising:
receiving, at a provider substrate extension of a cloud provider network embedded within a communications service provider network, a message to launch a customer compute instance, wherein the message is received from a control plane service of the cloud provider network;
launching the customer compute instance on a computer system of the provider substrate extension, the computer system having capacity for executing customer compute instances, wherein the provider substrate extension communicates with the cloud provider network via the communications service provider network, and wherein the customer compute instance communicates with a mobile device of a subscriber to the communications service provider network via the communications service provider network.

14. The computer-implemented method of claim 13, wherein the communications service provider network provides connectivity to devices of subscribers to the communications service provider network.

15. The computer-implemented method of claim 13, wherein the customer compute instance communicates with the mobile device without traversing a network that carries traffic of users not subscribed to the communications service provider network.

16. The computer-implemented method of claim 13, wherein the provider substrate extension communicates with the cloud provider network via a secure tunnel through the communications service provider network.

17. The computer-implemented method of claim 13, wherein the provider substrate extension is connected to at least one of a network component of a radio access network of the communications service provider network, a network component of an aggregation site of the communications service provider network, or a network component of a core network of the communications service provider network.

18. The computer-implemented method of claim 13, wherein the customer compute instance is at least one of a virtual machine or a container.

19. The computer-implemented method of claim 13, further comprising associating an internet protocol address with the customer compute instance, wherein the internet protocol address is from a pool of IP addresses in the address space of the communications service provider network allocated to the provider substrate extension.

20. The computer-implemented method of claim 13, wherein the control plane service is a hardware virtualization service.

* * * * *